US012170978B2

(12) United States Patent
Opshaug et al.

(10) Patent No.: US 12,170,978 B2
(45) Date of Patent: Dec. 17, 2024

(54) POSITIONING REFERENCE SIGNAL CONFIGURATIONS FOR CO-LOCATED TRANSMISSION RECEPTION POINTS

(71) Applicant: QUALCOMM Incorporated, San Diego, CA (US)

(72) Inventors: Guttorm Ringstad Opshaug, Redwood City, CA (US); Mukesh Kumar, Hyderabad (IN); Pulkit Rajgadiya, Churu (IN); Siddhant, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 17/347,366

(22) Filed: Jun. 14, 2021

(65) Prior Publication Data
US 2022/0400465 A1 Dec. 15, 2022

(51) Int. Cl.
*H04W 64/00* (2009.01)
*G01S 5/00* (2006.01)
(Continued)

(52) U.S. Cl.
CPC ......... *H04W 64/006* (2013.01); *G01S 5/0036* (2013.01); *G01S 5/0236* (2013.01);
(Continued)

(58) Field of Classification Search
CPC ... H04W 64/006; H04W 64/00; G01S 5/0036; G01S 5/0236; H04J 13/004; H04J 13/102;
(Continued)

(56) References Cited

U.S. PATENT DOCUMENTS

| 2015/0296359 A1* | 10/2015 | Edge | G01S 1/0428 |
| | | | 455/404.2 |
| 2023/0051329 A1* | 2/2023 | Flordelis | H04L 5/001 |
| 2023/0112171 A1* | 4/2023 | Guo | H04L 5/0051 |
| | | | 370/336 |

FOREIGN PATENT DOCUMENTS

EP 2567584 B1 6/2019

OTHER PUBLICATIONS

Intel Corporation: "Remaining Details of NR Positioning Physical Layer Procedures", 3GPP TSG RAN WG1 Meeting #98bis, R1-1910677, Intel-NRpos_Procedures, 3rd Generation Partnership Project, Mobile Competence Centre, 650, Route Des Lucioles, F-06921, Sophia-Antipolis Cedex, France vol. RAN WG1, No. Chongqing, China, Oct. 14, 2019-Oct. 20, 2019, Oct. 5, 2019, 12 Pages, XP051808642, Section 2.4.
(Continued)

*Primary Examiner* — Kabir A Timory
(74) *Attorney, Agent, or Firm* — Thien T. Nguyen

(57) ABSTRACT

Positioning for user equipments (UEs) in a wireless network is supported by restricting position reference signal (PRS) configuration parameters for a Transmission Reception Point (TRP) based on PRS configuration used by co-located TRPs. The PRS configuration parameters for the TRP may be restricted by restricting orthogonality of the PRS resources with respect to PRS resources from co-located TRPs to only code division multiplexing, and other types of orthogonality such as time division multiplexing and frequency divisional multiplexing are not permitted for co-located TRPs. The PRS configuration parameters for the TRP may be restricted to the same muting sequence type, e.g., inter-instance and/or intra-instance muting, as used by co-located TRPs. The PRS configuration parameters, e.g., related to orthogonality and/or muting, are not restricted with respect to non-co-located TRPs. The restrictions on the PRS configuration parameters for a TRP may be determined by a central authority, such as a location server.

6 Claims, 14 Drawing Sheets

(51) Int. Cl.
  *G01S 5/02* (2010.01)
  *H04J 13/00* (2011.01)
  *H04J 13/10* (2011.01)
  *H04L 5/00* (2006.01)

(52) U.S. Cl.
  CPC .......... *H04J 13/004* (2013.01); *H04J 13/102* (2013.01); *H04L 5/0051* (2013.01)

(58) Field of Classification Search
  CPC ... H04L 5/0051; H04L 5/0048; H04L 5/0094; H04L 5/026; H04L 27/261; H04L 5/0016
  See application file for complete search history.

(56) References Cited

OTHER PUBLICATIONS

Partial International Search Report—PCT/US2022/027252—ISA/EPO—Aug. 4, 2022.
Samsung: "DL Reference Signals for NR Positioning", 3GPP TSG RAN WG1 #98, R1-1908509, NR Positioning DL RS Design_SS, 3rd Generation Partnership Project, Mobile Competence Centre, 650, Route Des Lucioles, F-06921, Sophia-Antipolis Cedex, France, vol. RAN WG1, No. Prague, CZ, Aug. 26, 2019-Aug. 30, 2019 16, Aug. 16, 2019, pp. 1-10, XP051765117, Section 4.9.
International Search Report and Written Opinion—PCT/US2022/027252—ISA/EPO—Nov. 15, 2022.

\* cited by examiner

POSITIONING REFERENCE SIGNAL CONFIGURATIONS FOR CO-LOCATED TRANSMISSION RECEPTION POINTS

BACKGROUND

Field

The subject matter disclosed herein relates to wireless communications systems, and more particularly to systems, methods, and devices that support positioning reference signaling.

Information

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

Obtaining the location of a user equipment (UE) or a mobile device that is accessing a wireless network may be useful for many applications including, for example, emergency calls, personal navigation, asset tracking, locating a friend or family member, etc. Location determination of a UE can require usage of resources by a network for transmitting downlink positioning reference signals (PRS) from network Transmission Reception Points (TRPs) or receiving uplink sounding reference signals (SRS) from the UE that can be measured to obtain location measurements for the UE. PRS resources transmitted from TRPs may interfere with each other without careful management, e.g., from a centralized entity. Due to the large number of PRS resources available for positioning, particularly in NR, management of the PRS resources to avoid interference is difficult. Moreover, the proliferation of private networks and operators, which are not controlled by a centralized entity, further complicates management of the PRS resources to avoid interference.

SUMMARY

Positioning for user equipments (UEs) in a wireless network is supported by restricting position reference signal (PRS) configuration parameters for a Transmission Reception Point (TRP) based on PRS configuration used by co-located TRPs. The PRS configuration parameters for the TRP, for example, may be restrict orthogonality of the PRS resources with respect to PRS resources from co-located TRPs to only code division multiplexing, e.g., time division multiplexing and frequency divisional multiplexing are not permitted for co-located TRPs. The PRS configuration parameters for the TRP, in another example, may be restricted to using the same muting sequence type, e.g., inter-instance muting, intra-instance muting, or a combination thereof, as used for PRS resources for co-located TRPs. The PRS configuration parameters, e.g., related to orthogonality and/or muting, are not restricted with respect to non-co-located TRPs. The restrictions on the PRS configuration parameters for a TRP may be implemented by a central authority, such as a location server.

In one implementation, a method performed by a Transmission Reception Point (TRP) for supporting positioning of one or more user equipments (UEs) in a wireless network, the method includes restricting orthogonality of positioning reference signal (PRS) resources with respect to PRS resources from co-located TRPs to only code division multiplexing, wherein the PRS resources are prohibited from being orthogonal to PRS resources from the co-located TRPs using time division multiplexing or frequency divisional multiplexing; and transmitting PRS to the one or more UEs with the PRS resources restricted to only code division multiplexing orthogonality with respect to PRS transmitted from the co-located TRPs.

In one implementation, a Transmission Reception Point (TRP) configured for supporting positioning of one or more user equipments (UEs) in a wireless network, the TRP includes a wireless transceiver configured to communicate with UEs in the wireless network; at least one memory; at least one processor communicatively coupled to the wireless transceiver and the at least one memory, wherein the at least one processor is configured to: restrict orthogonality of positioning reference signal (PRS) resources with respect to PRS resources from co-located TRPs to only code division multiplexing, wherein the PRS resources are prohibited from being orthogonal to PRS resources from the co-located TRPs using time division multiplexing or frequency divisional multiplexing; and transmit, via the wireless transceiver, PRS to the one or more UEs with the PRS resources restricted to only code division multiplexing orthogonality with respect to PRS transmitted from the co-located TRPs.

A Transmission Reception Point (TRP) configured for supporting positioning of one or more user equipments (UEs) in a wireless network, the TRP comprising: means for restricting orthogonality of positioning reference signal (PRS) resources with respect to PRS resources from co-located TRPs to only code division multiplexing, wherein the PRS resources are prohibited from being orthogonal to PRS resources from the co-located TRPs using time division multiplexing or frequency divisional multiplexing; and means for transmitting PRS to the one or more UEs with the PRS resources restricted to only code division multiplexing orthogonality with respect to PRS transmitted from the co-located TRPs.

A non-transitory storage medium including program code stored thereon, the program code is operable to configure at least one processor in a Transmission Reception Point (TRP) for supporting positioning of one or more user equipments (UEs) in a wireless network, the program code comprising instructions to: restrict orthogonality of positioning reference signal (PRS) resources with respect to PRS resources from co-located TRPs to only code division multiplexing, wherein the PRS resources are prohibited from being orthogonal to PRS resources from the co-located TRPs using time division multiplexing or frequency divisional multiplexing; and transmit PRS to the one or more UEs with the PRS resources restricted to only code division multiplexing orthogonality with respect to PRS transmitted from the co-located TRPs.

In one implementation, a method performed by a Transmission Reception Point (TRP) for supporting positioning of one or more user equipments (UEs) in a wireless network, includes sending to a server all possible positioning reference signal (PRS) configurations supported by the TRP; receiving from the server PRS configuration parameters restricting a muting sequence type used for PRS resources to be the same as the muting sequence type used for PRS resources from co-located TRPs; and transmitting PRS to the one or more UEs using the muting sequence type.

In one implementation, a Transmission Reception Point (TRP) configured for supporting positioning of one or more user equipments (UEs) in a wireless network, the TRP includes a wireless transceiver configured to communicate with UEs in the wireless network; an external interface configured to communicate with entities in the wireless network; at least one memory; at least one processor communicatively coupled to the wireless transceiver, the external interface, and the at least one memory, wherein the at least one processor is configured to: send to a server, via the external interface, all possible positioning reference signal (PRS) configurations supported by the TRP; receive from the server, via the external interface, PRS configuration parameters that restrict a muting sequence type used for PRS resources to be the same as the muting sequence type used for PRS resources from co-located TRPs; and transmit, via the wireless interface, PRS to the one or more UEs using the muting sequence type.

In one implementation, a Transmission Reception Point (TRP) configured for supporting positioning of one or more user equipments (UEs) in a wireless network, the TRP include means for sending to a server all possible positioning reference signal (PRS) configurations supported by the TRP; means for receiving from the server PRS configuration parameters restricting a muting sequence type used for PRS resources to be the same as the muting sequence type used for PRS resources from co-located TRPs; and means for transmitting PRS to the one or more UEs using the muting sequence type.

In one implementation, a non-transitory storage medium including program code stored thereon, the program code is operable to configure at least one processor in a Transmission Reception Point (TRP) for supporting positioning of one or more user equipments (UEs) in a wireless network, the program code includes instructions to: send to a server all possible positioning reference signal (PRS) configurations supported by the TRP; receive from the server PRS configuration parameters that restrict a muting sequence type used for the PRS resources to be the same as the muting sequence type used for PRS resources from co-located TRPs; and transmit PRS to the one or more UEs using the muting sequence type.

In one implementation, a method performed by a server for supporting positioning of one or more user equipments (UEs) in a wireless network, the method includes receiving from a Transmission Reception Point (TRP) all possible positioning reference signal (PRS) configurations supported by the TRP; determining PRS configuration parameters for the TRP, wherein the PRS configuration parameters restrict the PRS resources transmitted by the TRP with respect to PRS resources from the co-located TRPs; and sending to the TRP the PRS configuration parameters.

In one implementation, a server configured for supporting positioning of one or more user equipments (UEs) in a wireless network, the server includes an external interface configured to communicate with entities in the wireless network; at least one memory; at least one processor communicatively coupled to the external interface, and the at least one memory, wherein the at least one processor is configured to: receive from a Transmission Reception Point (TRP), via the external interface, all possible positioning reference signal (PRS) configurations supported by the TRP; determine PRS configuration parameters for the TRP, wherein the PRS configuration parameters restrict the PRS resources transmitted by the TRP with respect to PRS resources from the co-located TRPs; and send to the TRP, via the external interface, the PRS configuration parameters.

In one implementation, a server configured for supporting positioning of one or more user equipments (UEs) in a wireless network, the server includes means for receiving from a Transmission Reception Point (TRP) all possible positioning reference signal (PRS) configurations supported by the TRP; means for determining PRS configuration parameters for the TRP, wherein the PRS configuration parameters restrict the PRS resources transmitted by the TRP with respect to PRS resources from the co-located TRPs; and means for sending to the TRP the PRS configuration parameters.

In one implementation, a non-transitory storage medium including program code stored thereon, the program code is operable to configure at least one processor in a server for supporting positioning of one or more user equipments (UEs) in a wireless network, the program code includes instructions to receive from a Transmission Reception Point (TRP) all possible positioning reference signal (PRS) configurations supported by the TRP; determine PRS configuration parameters for the TRP, wherein the PRS configuration parameters restrict the PRS resources transmitted by the TRP with respect to PRS resources from the co-located TRPs; and send to the TRP the PRS configuration parameters.

BRIEF DESCRIPTION OF THE FIGURES

Claimed subject matter is particularly pointed out and distinctly claimed in the concluding portion of the specification. However, both as to organization and/or method of operation, together with features and/or advantages thereof, it may best be understood by reference to the following detailed description if read with the accompanying drawings in which:

Figure 1:
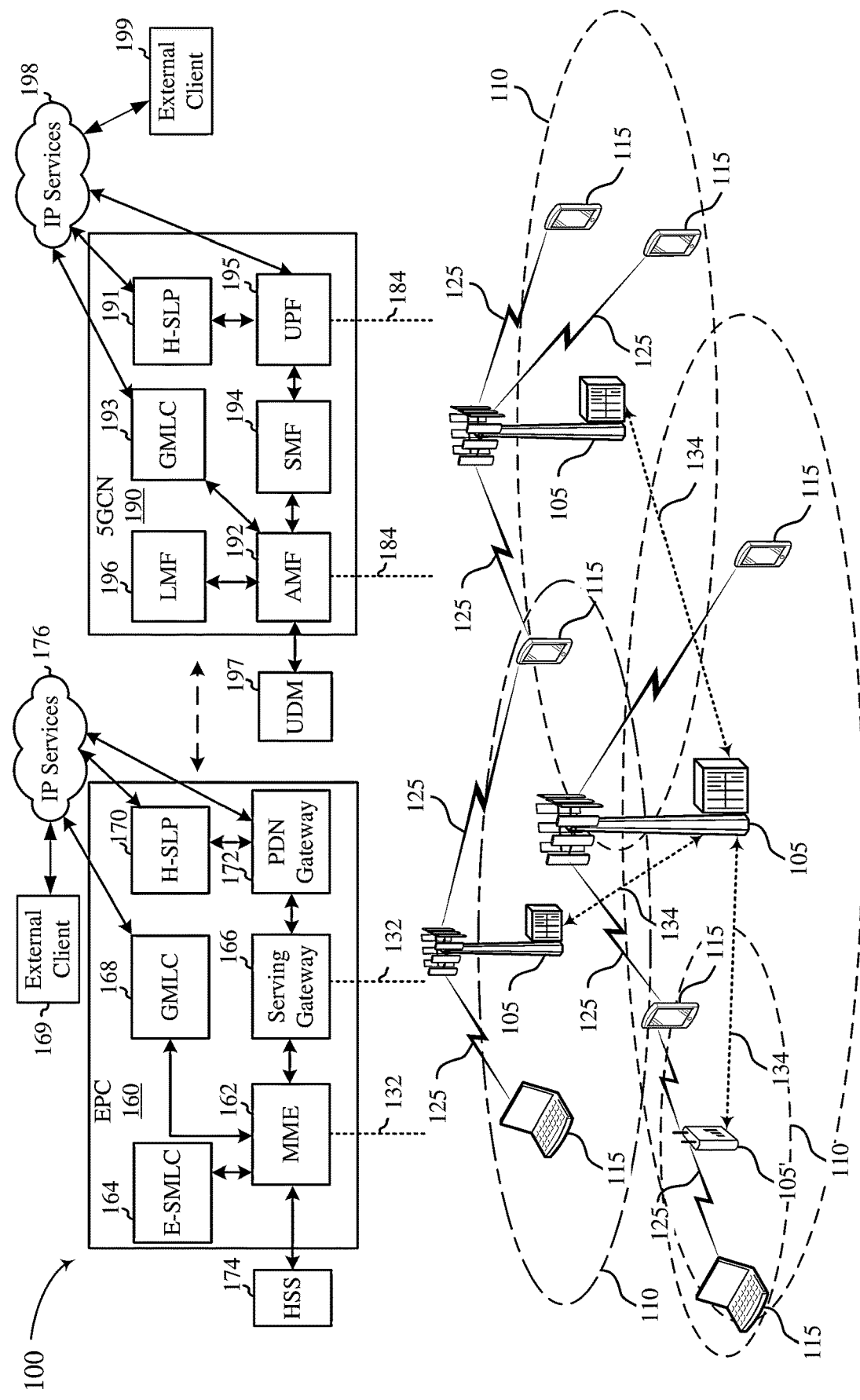
FIG. 1 is a diagram of a wireless communications system that may be used for positioning user equipment (UE), according to an embodiment.

Like reference symbols in the various drawings indicate like elements, in accordance with certain example implementations. In addition, multiple instances of an element may be indicated by following a first number for the element with a letter or a hyphen and a second number or letter. For example, multiple instances of an element 712 may be indicated as 712-1, 712-2, 712-3 etc. or as 712a, 712b, 712c, etc. When referring to such an element using only the first number, any instance of the element is to be understood (e.g., element 712 in the previous example would refer to any one or more of elements 712-1, 712-2, 712-3 etc. or as 712a, 712b, 712c).

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "one or more processors configured to" perform the described action.

A wireless multiple-access communication system may include a number of base stations, each simultaneously supporting communication for multiple communication devices, otherwise known as user equipment (UEs). In LTE or LTE-A networks, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units in communication with a central unit may define an access node (e.g., a new radio base station (NR BS), a new radio node-B (NR NB), a network node, 5G NB, gNB, etc.). A base station or DU, sometimes referred to herein as a TRP, may communicate with a set of UEs on downlink channels (e.g., for transmissions from a TRP to a UE) and uplink channels (e.g., for transmissions from a UE to a TRP).

As used herein, the terms "user equipment" (UE) and "base station" or "TRP" are not intended to be specific or otherwise limited to any particular Radio Access Technology (RAT), unless otherwise noted. In general, a UE may be any wireless communication device (e.g., a mobile phone, router, tablet computer, laptop computer, consumer tracking device for tracking consumer items, packages, assets, or entities such as individuals and pets, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station or TRP may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station or TRP may provide purely edge node signaling functions while in other systems it may provide additional control and/or network management functions. A communication link through which UEs can send signals to a base station or TRP is called an uplink (UL) channel (e.g., a reverse traffic channel, a reverse control channel, an access channel, etc.). A communication link through which the base station or TRP can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located, unless otherwise indicated. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Thus, a base station may include multiple co-located physical transmission points, or TRPs. For example, a base station may have multiple physical antenna panels, each of which may be used as a TRP, or any combination of the antennas may be used to create a TRP. Accordingly, TRP and base station are used interchangeably herein, unless specifically indicated to the contrary. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them to the location server without a request), may provide assistance data to the UE (e.g. if requested by the UE or in the absence of a request) and may request a location estimate or location measurements from a UE, e.g. for the Global Navigation Satellite System (GNSS), Time Difference Of Arrival (TDOA), Angle of Departure (AoD), Round-Trip Time (RTT) and multi cell RTT (Multi-RTT), and/or Enhanced Cell ID (ECID) position methods. Assistance data may be used by a UE to acquire and measure GNSS and/or reference signals, such as positioning reference signals (PRS) signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AoD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

A location server and a base station (e.g. an eNodeB (eNB) for LTE access or an NR NodeB (gNB) for NR access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the New Radio Position Protocol A (which may be referred to as NPPa or NRPPa) protocol may be used to transfer such messages between a base station that is a gNodeB and a location server that is an LMF.

During positioning using signaling in LTE and 5G NR, a UE typically acquires dedicated positioning signals transmitted by base stations, referred to as a Positioning Reference Signals (PRS), which are used to generate the desired measurements for the supported positioning technique. Positioning Reference Signals (PRS) are defined for 5G NR positioning to enable UEs to detect and measure more neighbor base stations or TRPs. Other types of signals, i.e., signals that are not dedicated for positioning, may be used by the UE for positioning. Several configurations are supported to enable a variety of deployments (indoor, outdoor, sub-6, mmW). To support PRS beam operation, beam sweeping is additionally supported for PRS. Table 1 below illustrates 3GPP release numbers (e.g., Rel.16 or Rel.15) that define particular reference signals for various UE measurements and the accompanying positioning techniques.

TABLE 1

| DL/UL Reference Signals | UE Measurements | To facilitate support of the following positioning techniques |
| --- | --- | --- |
| Rel.16 DL PRS | DL RSTD | DL-TDOA |
| Rel.16 DL PRS | DL PRS RSRP | DL-TDOA, DL-AoD, Multi-RTT |
| Rel.16 DL PRS / Rel.16 SRS for positioning | UE Rx-Tx time difference | Multi-RTT |
| Rel. 15 SSB / CSI-RS for RRM | SS-RSRP(RSRP for RRM), SS-RSRQ(for RRM), CSI-RSRP (for RRM), CSI-RSRQ (for RRM) | E-CID |

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR, and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message.

Positioning procedures, e.g., in the NG-RAN, are modelled as transactions of the LPP protocol. A procedure, for example, consists of a single operation of one of the following types: exchange of positioning capabilities; transfer of assistance data; transfer of location information (positioning measurements and/or position estimate); error handling; and abort.

Thus, for example, during a positioning session, a UE may report its capabilities to process reference signals, such as PRS, in the exchange of positioning capabilities. The UE may receive positioning assistance data to perform PRS measurements in the transfer of assistance data. The assistance data provided to the UE, however, may include configurations for significantly more PRS resources than the UE is capable of processing. The assistance data may sort the PRS according to priority for measurement by a UE. For example, when a UE is configured in the assistance data of a positioning method with a number of PRS resources beyond its capability, e.g., for AoD, TDOA, MRTT, etc., the UE may assume the DL-PRS Resources in the assistance data are sorted in a decreasing order of measurement priority.

There may be a significant number of PRS resources available for positioning. The PRS, however, may interfere with other PRSs unless orthogonality between PRS resources is achieved. Multiple technologies are currently deployed to prevent or minimize interference including time division multiple access (TDMA) that produces orthogonality in the time domain, frequency division multiple access (FDMA) that produces orthogonality in the frequency domain, and code division multiple access (CDMA) that produces orthogonality in a code domain. Each of these technologies may be used under current standards. Selection and implementation of the type of orthogonality to be employed by a TRP is not standardized, but is an ad hoc process dependent on various factors, such as operator requirements, environment conditionings, propagations models, etc.

Additionally, to further reduce interference, muting of DL PRS resources may be used. Muting is used to "turn-off" DL PRS resources (e.g., transmit with zero-power) to reduce interference when there is collision of DL PRS resources across TRPs. Muting is signaled using a bit-map to indicate which configured DL PRS resources are transmitted with zero-power. Multiple types of muting may be used under current standards. Again, selection and implementation of the type of muting to be employed by a TRP is not standardized but is an ad hoc process.

With the large number of PRS resources that are available, maintaining orthogonality and muting characteristics between PRS resources is a complex task. Moreover, as with the presence of private networks and operators which are not connected to a centralized entity, maintaining orthogonality and muting characteristics to reduce interference is further complicated.

The use of a random selection of technologies to be employed by TRPs to prevent or reduce interference between DL PRS resources is not optimal for UE or networks in terms of performance and power requirements. For example, some implementations, may simplify network performance may be difficult for UE processor or vice versa.

In an implementation discussed herein, positioning of one or more UEs in a wireless network may be supported by restricting the type of orthogonality used of PRS for co-located TRPs. For example, co-located TRPs may be restricted to use only code division multiplexing, so that the co-located TRPs cannot use time division multiplexing or frequency divisional multiplexing. In an implementation, positioning of one or more UEs in a wireless network may be supported by restricting a muting sequence type used for PRS resources for co-located TRPs. For example, co-located TRPs may be restricted to using the same muting sequence type. Non-co-located TRPs, on the other hand, have no restrictions with respect to the type of orthogonality or muting sequence type used for PRSs.

FIG. 1 illustrates an example of a wireless communications system 100 that supports restricted PRS configurations for co-located TRPs, in accordance with one or more aspects of the present disclosure. The wireless communications system 100 includes TRPs 105 (sometimes referred to as base stations 105), UEs 115, and one or more core networks, illustrated as an Evolved Packet Core (EPC) 160 and a Fifth Generation Core (5GC) 190. While two core networks are shown the wireless communications system may use only one core network, e.g., the 5GC 190. In some examples, the wireless communications system 100 may be a Long Term Evolution (LTE) network, an LTE-Advanced (LTE-A) network, an LTE-A Pro network, or a New Radio (NR) network.

Base stations 105 may wirelessly communicate with UEs 115 via one or more base station antennas. A base station 105 as described herein may include or may be referred to by those skilled in the art as a TRP, base transceiver station, a radio base station, an access point, a radio transceiver, a NodeB, an eNodeB (eNB), a next-generation NodeB or giga-nodeB (either of which may be referred to as a gNB), a Home NodeB, a Home eNodeB, an access point, a base transceiver station, a radio base station, a radio transceiver, a transceiver function, a basic service set (BSS), an extended service set (ESS), or some other suitable terminology. The base station 105 provides an access point to the EPC 160 or 5GC 190 for a UE 115. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink (UL) transmissions from a UE 115 to a base station 105, downlink (DL) transmissions from a base station 105 to a UE 115, or sidelink transmissions from one UE 115 to another UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a base station 105 may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a personal electronic device such as a cellular phone, a smart phone, a session initiation protocol (SIP) phone, a personal digital assistant (PDA), a satellite radio, a global positioning system, a multimedia device, a video device, a digital audio player (such as an MP3 player), a camera, a game console, a wearable device, a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, a healthcare device, an implant, a sensor/actuator, a display, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or to enable automated behavior by machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the EPC 160 and/or 5GC 190 and with one another. For example, base stations 105 (e.g., which may be an example of an evolved NodeB (eNB), a next generation NodeB (gNB), or an access node controller (ANC)) may interface with their respective core networks through backhaul links (e.g., via an S1, N2, N3, or other interface). For example, eNB base stations 105 may interface with EPC 160 via backhaul links 132, while gNB base stations 105 may interface with 5GC 190 via backhaul links 184. Base stations 105 may communicate with one another over backhaul links 134 (e.g., via an X2, Xn, or other interface), which may be wired or wireless communication links, either directly (e.g., directly between base stations 105) or indirectly (e.g., via core network or intermediate base stations). The backhaul links 134 may be wired or may be wireless, as illustrated by backhaul link 134 to movable base station 105'.

The core networks 160/190 may provide user authentication, access authorization, tracking, Internet Protocol (IP) connectivity, and other access, routing, or mobility functions. The EPC 160, by way of example, may include a Mobility Management Entity (MME) 162, an Enhanced Serving Mobile Location Center (E-SMLC) 164, a Serving Gateway 166, a Gateway Mobile Location Center (GMLC) 168, a Home Secure User Plane Location (SUPL) Location Platform (H-SLP) 170, and a Packet Data Network (PDN) Gateway 172. The MME 162 may be in communication with a Home Subscriber Server (HSS) 174. The MME 162 is the control node that processes the signaling between the UEs 115 and the EPC 160. Generally, the MME 162 provides bearer and connection management. The E-SMLC 164 may support location determination of the UEs, e.g., using the 3GPP control plane (CP) location solution. All user Internet protocol (IP) packets are transferred through the Serving Gateway 166, which itself is connected to the PDN Gateway 172. The PDN Gateway 172 provides UE IP address allocation as well as other functions. The PDN Gateway 172 is connected to the IP Services 176. The IP Services 176 may include the Internet, an intranet, an IP Multimedia Subsystem (IMS), a PS Streaming Service, and/or other IP services. The GMLC 168 may provide location access to the UE on behalf of external clients 169, e.g., that may be within or IP Services 176. The H-SLP 170 may support the SUPL User Plane (UP) location solution defined by the Open Mobile Alliance (OMA) and may support location services for UEs based on subscription information for the UEs stored in H-SLP 170.

The 5GC 190 may include an H-SLP 191, an Access and Mobility Management Function (AMF) 192, a Gateway Mobile Location Center (GMLC) 193, a Session Management Function (SMF) 194, and a User Plane Function (UPF) 195, a Location Management Function (LMF) 196. The AMF 192 may be in communication with a Unified Data Management (UDM) 197. The AMF 192 is the control node that processes the signaling between the UEs 115 and the 5GC 190 and which, for positioning functionality, may communicate with the LMF 196, which may support location determination of UEs. In some implementations, the LMF 196 may be co-located with a base station 105 in the NG-RAN and may be referred to as a Location Management Component (LMC) or Location Server Surrogate (LSS). The GMLC 193 may be used to allow an external client 199, outside or within IP Services 198, to receive location information regarding the UEs. All user Internet protocol (IP) packets may be transferred through the UPF 195. The UPF 195 provides UE IP address allocation as well as other functions. The UPF 195 is connected to the IP Services 198. The H-SLP 191 may likewise be connected to the IP Services 198. The IP Services 198 may include the Internet, an intranet, an IP Multimedia Subsystem (IMS), a PS Streaming Service, and/or other IP services.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be regarded as supporting different spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 160/190 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds ($Tf=307200*Ts$). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols and, in some instances, a symbol of a mini-slot or the mini-slot itself may be the smallest unit of scheduling. Each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one subcarrier (e.g., a 15 kHz frequency range). A resource block may contain 12 consecutive subcarriers in the frequency domain and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple subcarriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations 105 or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs 115 that can support simultaneous communications via carriers associated with more than one different bandwidth.

As described herein, wireless communications system 100 may support NR and support communications between the one or more base stations 105 and supported UEs 115 using communication links 125. The UEs 115 may be dispersed throughout the wireless communications system 100, and each UE 115 may be stationary or mobile. Wireless communications system 100 may minimize always-on transmission and support forward capability, including transmission of reference signals based on a need at a base station 105 or a UE 115. As part of the communication, each of the base stations 105 and UEs 115 may support reference signal transmission for operations, including channel estimation, beam management and scheduling, and wireless device positioning within the one or more coverage areas 110.

For example, the base stations 105 may transmit one or more downlink reference signals for NR communications, including channel state information reference signal (CSI-RS) transmission. Each of the CSI-RS transmissions may be configured for a specific UE 115 to estimate the channel and report channel quality information. The reported channel quality information may be used for scheduling or link adaptation at the base stations 105 or as part of a mobility or beam management procedure for directional transmission associated with the enhanced channel resources.

In some examples, the base stations 105 may transmit one or more additional downlink reference signals for communication, including a positioning reference signal (PRS) transmission. The PRS transmission may be configured for a specific UE 115 to measure and report one or more report parameters (for example, report quantities) associated with positioning and location information. A base station 105 may use the reported information as part of a UE-assisted positioning technique. The PRS transmission and report parameter feedback may support various location services (for example, navigation systems and emergency communications). In some examples, the report parameters supplement one or more additional location systems supported by the UE 115 (such as global positioning system (GPS) technology).

A base station 105 may configure a PRS transmission on one or more PRS resources of a channel. The PRS transmissions may be multiplexed, for example, using TDM techniques, FDM techniques, code division multiplexing (CDM) or a combination thereof. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 105. The structure of the one or more PRS resources, PRS resource sets, and PRS resource settings within a PRS transmission may be referred to as a multi-level resource setting. For example, multi-level PRS resource setting of the base station 105 may include multiple PRS resource sets and each PRS resource set may contain a set of PRS resources (such as a set of 4 PRS resources).

The UE 115 may receive the PRS transmission over the one or more PRS resources of the slot. The UE 115 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Aspects of wireless communications system 100 may include use of PRS transmissions by the base station 105 or sounding reference signal (SRS) transmissions by the UE 115 for UE location determination. For downlink-based UE location determination, a location server, e.g., an E-SMLC 164 in an LTE network or an LMF 196, LMC, LSS in a NR network (sometimes referred to as location server 164/196), may be used to provide positioning assistance data (AD) to the UE 115. In UE-assisted positioning, the location server may receive measurement reports from the UE 115 that indicates position measurements for one or multiple base stations 105 with which location server may determine a position estimate for the UE 115, e.g., using OTDOA, or other desired techniques.

A position estimation of the UE 115 may be determined using reference signals, such as PRS signals, from one or more base stations 105. Positioning methods, such as Observed Time Difference of Arrival (OTDOA), DL Time Difference of Arrival (DL-TDOA), DL Reference Signal Received Power (DL RSRP), time difference between reception and transmission of signals (Rx-Tx), DL Angle of Departure (DL AoD), Enhanced Cell ID (ECID) are position methods that may be used to estimate the position of the UE 115 using reference signals from base stations. OTDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS)—e.g. as defined in 3GPP TS 36.211.

Other positioning methods may use reference signals transmitted by or received by base stations. While the present disclosure may be detailed with reference to a single positioning method for brevity, it should be understood that present disclosure is applicable to multiple positioning methods, including downlink-based positioning methods, uplink based positioning methods and downlink and uplink based positioning methods. For example, other positioning methods include, e.g., downlink based positioning methods such as DL Time Difference of Arrival (DL-TDOA), UL Reference Signal Received Power (UL RSRP), time difference between reception and transmission of signals (Rx-Tx), DL Angle of Departure (DL AoD), Enhanced Cell ID (ECID); uplink based positioning methods, e.g., UL Time Difference of Arrival (UL-TDOA), UL Angle of Arrival (UL AoA), UL Relative Time of Arrival (UL-RTOA); and downlink and uplink based positioning methods, e.g., Round-trip time (RTT) with one or more neighboring base stations.

Figure 2:
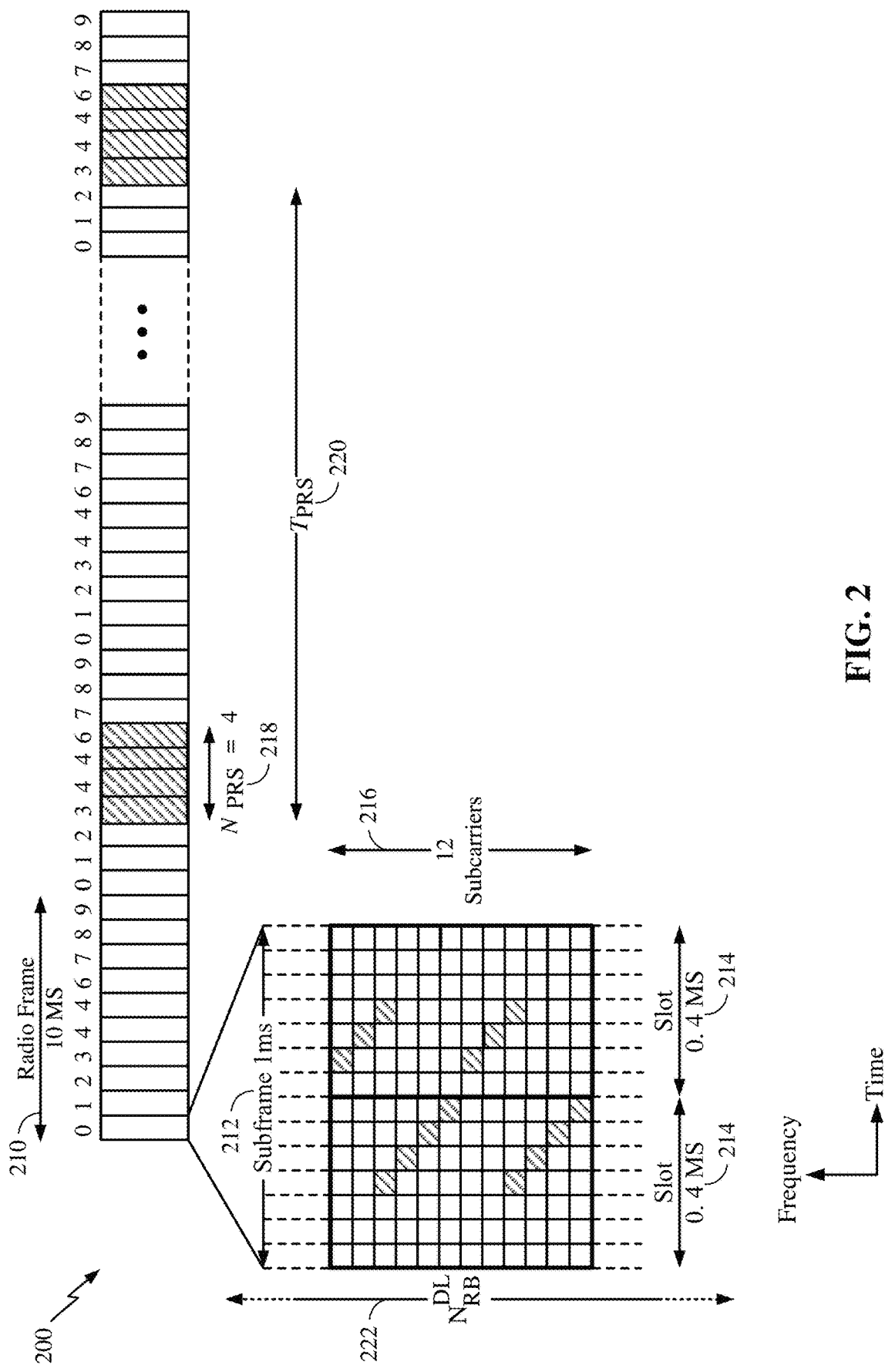
FIG. 2 shows a structure of an exemplary conventional subframe sequence with positioning reference signal (PRS) positioning occasions.

FIG. 2 shows a structure of an exemplary conventional subframe sequence 200 with PRS positioning occasions. Subframe sequence 200 may be applicable to the broadcast of PRS signals from a base station (e.g., any of the base stations described herein) or other network node. The subframe sequence 200 may be used in LTE systems, and the same or similar subframe sequence may be used in other communication technologies/protocols, such as 5G NR. In FIG. 2, time is represented horizontally (e.g., on the X axis) with time increasing from left to right, while frequency is represented vertically (e.g., on the Y axis) with frequency increasing (or decreasing) from bottom to top. As shown in FIG. 2, downlink and uplink radio frames 210 may be of 10 millisecond (ms) duration each. For downlink frequency division duplex (FDD) mode, radio frames 210 are organized, in the illustrated example, into ten subframes 212 of 1 ms duration each. Each subframe 212 comprises two slots 214, each of, for example, 0.5 ms duration.

In the frequency domain, the available bandwidth may be divided into uniformly spaced orthogonal subcarriers 216 (also referred to as "tones" or "bins"). For example, for a normal length cyclic prefix (CP) using, for example, 15 kHz spacing, subcarriers 216 may be grouped into a group of twelve (12) subcarriers. A resource of one OFDM symbol length in the time domain and one subcarrier in the frequency domain (represented as a block of subframe 212) is referred to as a resource element (RE). Each grouping of the 12 subcarriers 216 and the 14 OFDM symbols is termed a resource block (RB) and, in the example above, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$. For example, for a 3 MHz channel bandwidth in the above example, the number of available resource blocks on each channel 222 is given by $N_{RB}^{DL}=15$. Note that the frequency component of a resource block (e.g., the 12 subcarriers) is referred to as a physical resource block (PRB).

A base station may transmit radio frames (e.g., radio frames 210), or other physical layer signaling sequences, supporting PRS signals (i. e. a downlink (DL) PRS) according to frame configurations either similar to, or the same as that, shown in FIG. 2, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 2.

A collection of resource elements that are used for transmission of PRS signals is referred to as a "PRS resource." The collection of resource elements can span multiple PRBs in the frequency domain and N (e.g., 1 or more) consecutive symbol(s) within a slot 214 in the time domain. For example, the cross-hatched resource elements in the slots 214 may be examples of two PRS resources. A "PRS resource set" is a set of PRS resources used for the transmission of PRS signals, where each PRS resource has a PRS resource identifier (ID). In addition, the PRS resources in a PRS resource set are associated with the same TRP. A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $TRP_S$ of milliseconds or subframes. As an example, FIG. 2 illustrates a periodicity of positioning occasions where $N_{PRS}$ equals 4 218 and TRPS is greater than or equal to 20 220. In some aspects, $TRP_S$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a jth positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($TRP_S$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE, via a network entity, such as a location server (e.g., LMF, LMU, LSS, or LMC) or a base station (e.g., gNB), to enable the UE to perform PRS positioning measurements. The PRS configurations may be provided, for example, per TRP. In some implementations, the UE may receive PRS configuration information from both the location server and the base station. For example, the PRS configurations may be provided to the UE from a location server per base station (e.g., gNB), and the base station may determine the PRS offset of each TRP and may provide this configuration to the UE. The UE is not expected to blindly perform detection of PRS configurations.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS), transmitter reference signals (TRS), cell-specific reference signals (CRS), channel state information reference signals (CSI-RS), primary synchronization signals (PSS), secondary synchronization signals (SSS), etc.

Figure 3:
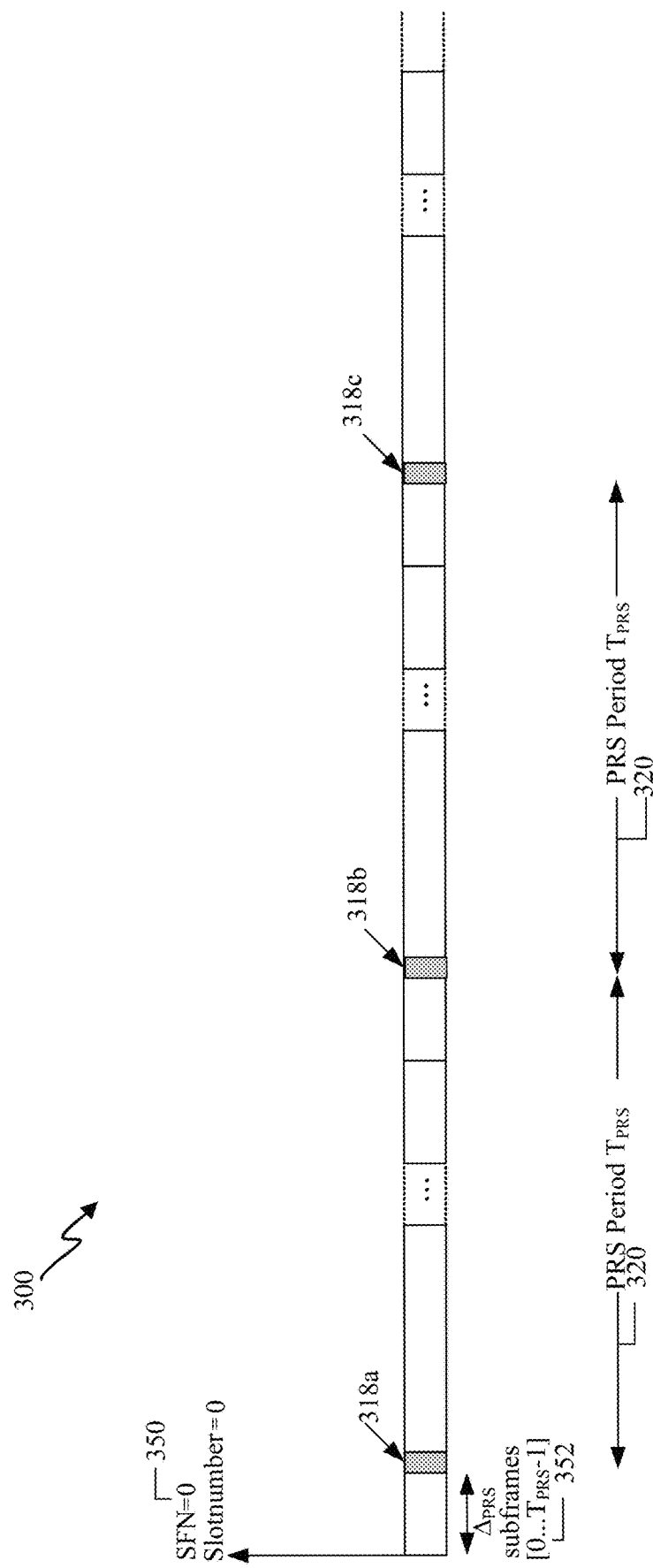
FIG. 3 illustrates an exemplary PRS configuration for a cell supported by a wireless node.

FIG. 3 illustrates an exemplary PRS configuration 300 for a cell supported by a wireless node (such as a base station 105). Again, PRS transmission for LTE is assumed in FIG. 3, although the same or similar aspects of PRS transmission to those shown in and described for FIG. 3 may apply to 5G, NR, and/or other wireless technologies. FIG. 3 shows how PRS positioning occasions are determined by a System Frame Number (SFN), a cell specific subframe offset ($\Delta_{PRS}$) 352, and the PRS Periodicity ($TRP_S$) 320. Typically, the cell specific PRS subframe configuration is defined by a "PRS Configuration Index" $I_{PRS}$ included in the OTDOA assistance data. The PRS Periodicity ($TRP_S$) 320 and the cell specific subframe offset ($\Delta_{PRS}$) are defined based on the PRS Configuration Index $I_{PRS}$, in 3GPP TS 36.211 entitled "Physical channels and modulation," as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0, \qquad \text{eq. 1}$$

where $n_f$ is the SFN with $0 \le n_f \le 1023$, $n_s$ is the slot number within the radio frame defined by $n_f$ with $0 \le n_s \le 19$, $TRP_S$ is the PRS periodicity 320, and $\Delta_{PRS}$ is the cell-specific subframe offset 352.

As shown in FIG. 3, the cell specific subframe offset $\Delta_{PRS}$ 352 may be defined in terms of the number of subframes transmitted starting from System Frame Number 0 (Slot 'Number 0', marked as slot 350) to the start of the first (subsequent) PRS positioning occasion. In the example in FIG. 3, the number of consecutive positioning subframes ($N_{PRS}$) in each of the consecutive PRS positioning occasions 318a, 318b, and 318c equals 4.

In some aspects, when a UE 115 receives a PRS configuration index $I_{PRS}$ in the OTDOA assistance data for a particular cell, the UE 115 may determine the PRS periodicity $TRP_S$ 320 and PRS subframe offset $\Delta_{PRS}$ using Table 2. The UE 115 may then determine the radio frame, subframe and slot when a PRS is scheduled in the cell (e.g., using equation (1)).

Typically, PRS occasions from all cells in a network that use the same frequency are aligned in time and may have a fixed known time offset (e.g., cell-specific subframe offset 352) relative to other cells in the network that use a different frequency. In SFN-synchronous networks all wireless nodes (e.g., base stations 105) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 115 may determine the timing of the PRS occasions of the reference and neighbor cells for OTDOA positioning, if the UE 115 can obtain the cell timing (e.g., SFN or Frame Number) of at least one of the cells, e.g., the reference cell or a serving cell. The timing of the other cells may then be derived by the UE 115 based, for example, on the assumption that PRS occasions from different cells overlap.

As defined by 3GPP (e.g., in 3GPP TS 36.211), for LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ that can be implicitly included as part of the muting pattern in (iv) when present. In some cases, with a fairly low PRS duty cycle, $N_{PRS}=1$, $TRP_S=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $TRP_S$ (e.g., less than 160 ms), up to the full duty cycle (i.e., $N_{PRS}=TRP_S$), may also be used in later versions of LPP according to 3GPP TS 36.355. A directional PRS may be configured as just described according to 3GPP TSs and may, for example, use a low PRS duty cycle (e.g., $N_{PRS}=1$, $TRP_S=160$ subframes) or a high duty cycle.

A New Radio (NR) DL PRS resource may be defined as a set of resource elements used for NR DL PRS transmission that can span multiple PRBs within N (1 or more) consecutive symbol(s) within a slot. In any OFDM symbol, a PRS resource occupies consecutive PRBs.

A DL PRS Resource Set may be defined as a set of DL PRS Resources, where each DL PRS Resource has a DL PRS Resource ID. The DL PRS Resources in a DL PRS Resource set are associated with the same TRP. A DL PRS Resource ID in a DL PRS Resource set may be associated with a single beam transmitted from a single TRP, e.g., where the TRP may transmit one or more beams. It may be noted that this does not have any implications on whether the TRPs and beams from which signals are transmitted are known to a UE.

A DL PRS occasion may be one instance of periodically repeated time windows (consecutive slot(s)) where DL PRS is expected to be transmitted. A DL PRS configuration, e.g., including DL PRS transmission schedule, may be indicated to a UE for DL PRS positioning measurements. For example, the UE may not be expected to perform any blind detection of DL PRS configurations.

Figure 4:
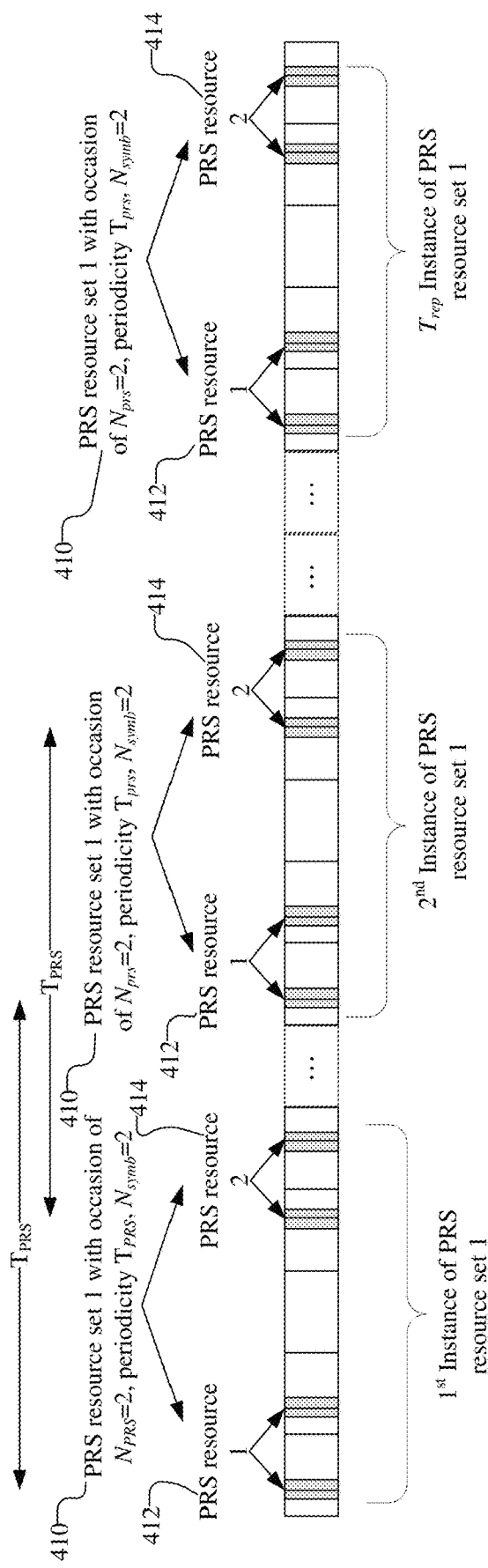
FIG. 4 illustrates an exemplary PRS configuration in a multi-beam system.

FIG. 4 illustrates an exemplary PRS configuration 400 in a multi-beam system. A base station 105, for example, may configure multiple PRS resource sets, each one associated with one periodicity, and transmitted across multiple occasions. As illustrated, a PRS resource set 1 410 may be defined as a set of PRS resources, including PRS resource 1 412 and PRS resource 2 414, which are sets of resource elements spanning multiple PRBs within N (1 or more) consecutive symbol(s) within a slot. Each of PRS resource 1 412 and PRS resource 2 414 has a DL PRS Resource ID and are both are associated with the same TRP, but may be transmitted on different beams. FIG. 4 illustrates a first instance 410a of PRS resource set 1 410, a second instance 410b of PRS resource set 1 410, and a $T_{rep}$ instance 410a of PRS resource set 1 410. The PRS resource set 1 410 is defined with an occasion of $N_{RPS}=2$, a periodicity $TRP_S$, and $N_{symb}=2$. FIG. 4 illustrates an example where one configured $T_{rep}$-bit muting pattern controls which occasion of the PRS resource is muted.

By agreement made in RAN1 under 3GPP, a "frequency layer" renamed to a "positioning frequency layer" for positioning, is a collection of DL PRS Resource Sets across one or more TRPs which have the same subcarrier spacing (SCS) and cyclic prefix (CP) type, the same center frequency, and the same point-A. All DL PRS Resource Sets belonging to the same positioning frequency layer have the same value of DL PRS Bandwidth and Start PRB. Further, all DL PRS Resource Sets belonging to the same positioning frequency layer have the same value of comb size.

Conventionally, if the DL reference signal to be used as a DL path loss reference is a DL-PRS, the dl-PRS-Resource-Power is provided. The dl-PRS-Resource-Power is defined as average Energy Per Resource Element (EPRE) of the resource elements that carry DL-PRS Resource signals in dBm that the TRP uses for DL-PRS Resource transmission.

In terms of DL PRS transmission (TX) power, conventionally, the UE assumes a constant EPRE for all resource elements (REs) of a given DL PRS Resource and that the DL PRS Resource TX power value range is the same as for synchronization signal block (SSB). Further, by agreement in RAN1, a UE includes a capability defined as the duration of DL PRS symbols in units of ms that the UE can process every T ms assuming 272 PRB allocation.

As discussed above, PRS may be muted. A bitmap for DL PRS muting may be configured for a DL PRS Resource Set. The bitmap size values, for example, may be 2, 4, 8, 16, 32 bits. Multiple options for the applicability of the bitmap are supported. In a first option, each bit in the bitmap corresponds to a configurable number of consecutive instances (in a periodic transmission of DL-PRS resource sets) of a DL-PRS Resource set. All DL-PRS Resources within a DL-PRS Resource Set instance are muted for a DL-PRS Resource Set instance that is indicated to be muted by the bitmap. In a second option, each bit in the bitmap corresponds to a single repetition index for each of the DL-PRS Resources within an instance of a DL-PRS Resource Set, e.g., the length of the bitmap is equal to DL-PRS-ResourceRepetitionFactor. The second option may apply to all instances of the DL-PRS Resource Set that the above DL-PRS Resources are part of.

Figure 5:
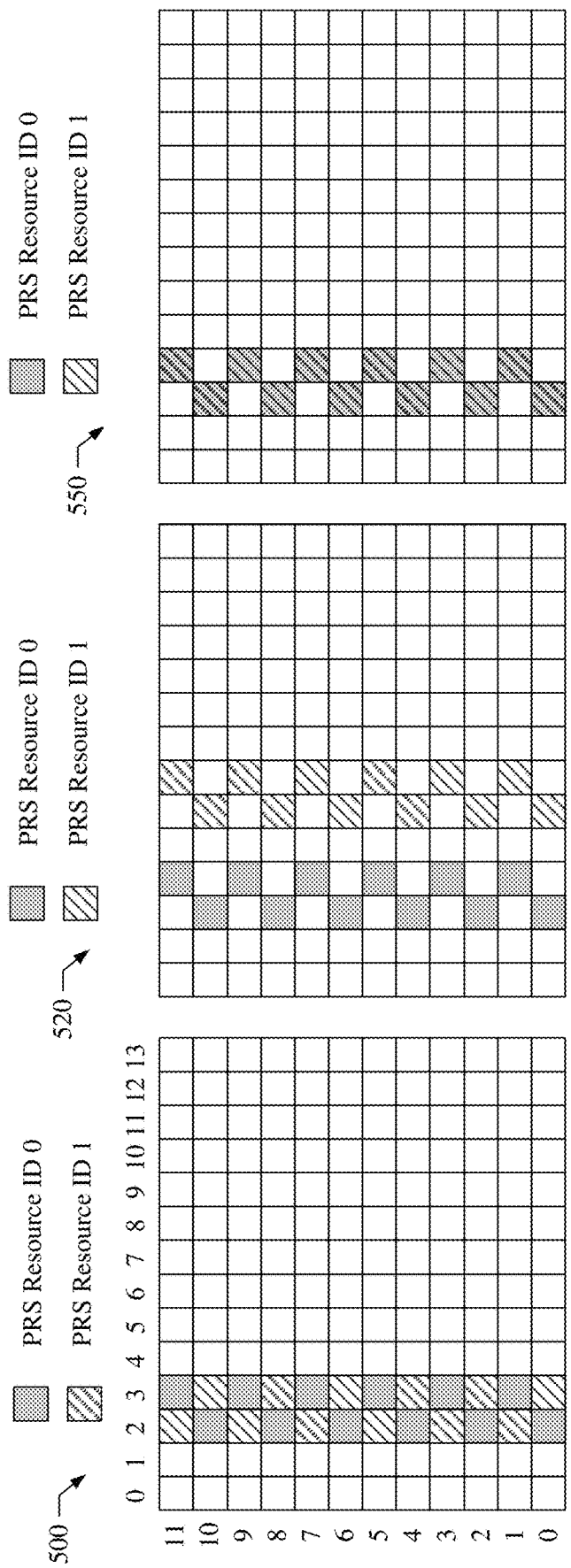
FIGS. 5A, 5B, and 5C illustrate respective frequency division multiplexing (FDM), time division multiplexing (TDM), and code division multiplexing (CDM), or PRS resources.

FIGS. 5A, 5B, and 5C illustrate frequency division multiplexing (FDM) 500, time division multiplexing (TDM) 520 and code division multiplexing (CDM) 550, respectively, to generate orthogonality between two PRS Resources ID 0 (illustrated with solid boxes) and PRS Resources ID 1 (illustrated with hatched boxes).

As illustrated in FIG. 5A, with FDM 500 the two separate PRS resources are transmitted in the same subframes (e.g., subframes 2 and 3), but with different frequencies so that there is no overlap. Frequency orthogonality, as illustrated by FDM 500, is achieved through a distinct frequency offset, sometimes referred to as vshift, e.g., in LTE specifications, or Resource Element Offset (ReOffset), e.g., in 5G NR specifications, and the comb size, that is defined in the standards. For example, as per 3GPP TS 37.355, the frequency orthogonality is defined per PRS resource and is specified by the dl-PRS-CombSizeN-AndReOffset.

As illustrated in FIG. 5B, with TDM 520 the two separate PRS resources are transmitted with the same frequencies, but at different times, e.g., in subframes 2 and 3, and subframes 5 and 6, respectively, so that there is no overlap. Time orthogonality, as illustrated by TDM 520, is achieved through a slot offset and symbol offset that is defined in the standards. For example, as per 3GPP TS 37.355, the time orthogonality is defined per PRS resource and is specified by dl-PRS-ResourceSlotOffset and dl-PRS-ResourceSymbolOffset.

As illustrated in FIG. 5C, with CDM 550 the two separate PRS resources may be transmitted with the same frequencies and at the same (e.g., subframes 2 and 3), but are each assigned a different pseudorandom code sequence. Code orthogonality, as illustrated by CDM 550, is achieved through a scrambling ID that is used to encode and decode the PRS signal and is defined in the standards. For example, as per 3GPP TS 37.355, the code sequences a defined per PRS resource and is specified by dl-PRS-SequenceID.

As discussed above, a large number of PRS resources are possible, particularly in NR. For example, as defined by 3GPP TS 37.355, the maximum frequency layers available is 4, the maximum number of TRPs per frequency layer is 64, the maximum number of resource sets per TRP is 7, and the maximum number of resources per resource set is 63 for a maximum number of available PRS resources of 112,896 (4*64*7*63=112,896). Maintaining orthogonality between such as large number of resources is a complex task. Moreover, with the addition of private networks and operates, the use of a centralized entity to maintain orthogonality may not be possible, which further complicates the task of maintaining orthogonality between a large number of PRS resources.

There are multiple ways to maintain orthogonality, which may depend on operation requirements, environment conditions, propagation models, etc. A random selection technique to maintain orthogonality, however, is not optimal for UEs or the networks. For example, some implementations may simplify network deployment, but may be difficult for UE processing, or may simplify UE processing, but may cause difficulties for deployment. It is desirable to find a way to simplify the selection of parameters for maintaining orthogonality which is consistent with current standards.

Accordingly, in one implementation, TRPs that are co-located are restricted on the type of orthogonality that may be used. For example, co-located TRPs may be restricted to using only CDM, i.e., using different scrambling code IDs, and not using FDM or TDM, i.e., using the same comb size, frequency offset, slot offset, and symbol offset. By restricting co-located TRPs to only CDM, the use of FDM and TDM is eliminated which reduces deployment complexity by approximately 3 times. Moreover, co-located TRPs are close and maintaining synchronization between the TRPs is simplified, which is beneficial for CDM. TRPs that are not co-located may have no restrictions on the type of orthogonality used.

Restricting the type of orthogonality for co-located TRPs may be beneficial for UE positioning procedures. For example, the PRS transmitted from co-located TRPs may be measured at the same time, i.e., in the same symbols, which will provide better estimate than PRS resources that have different symbol offsets. Moreover, the measurement of the PRS from co-located TRPs may be done offline with a very small radio on time, as all of the PRS resources are transmitted in the same symbols. Accordingly, UEs will have power savings while in IDLE/INACTIVE mode, as well as improved positioning performance.

Figure 6:
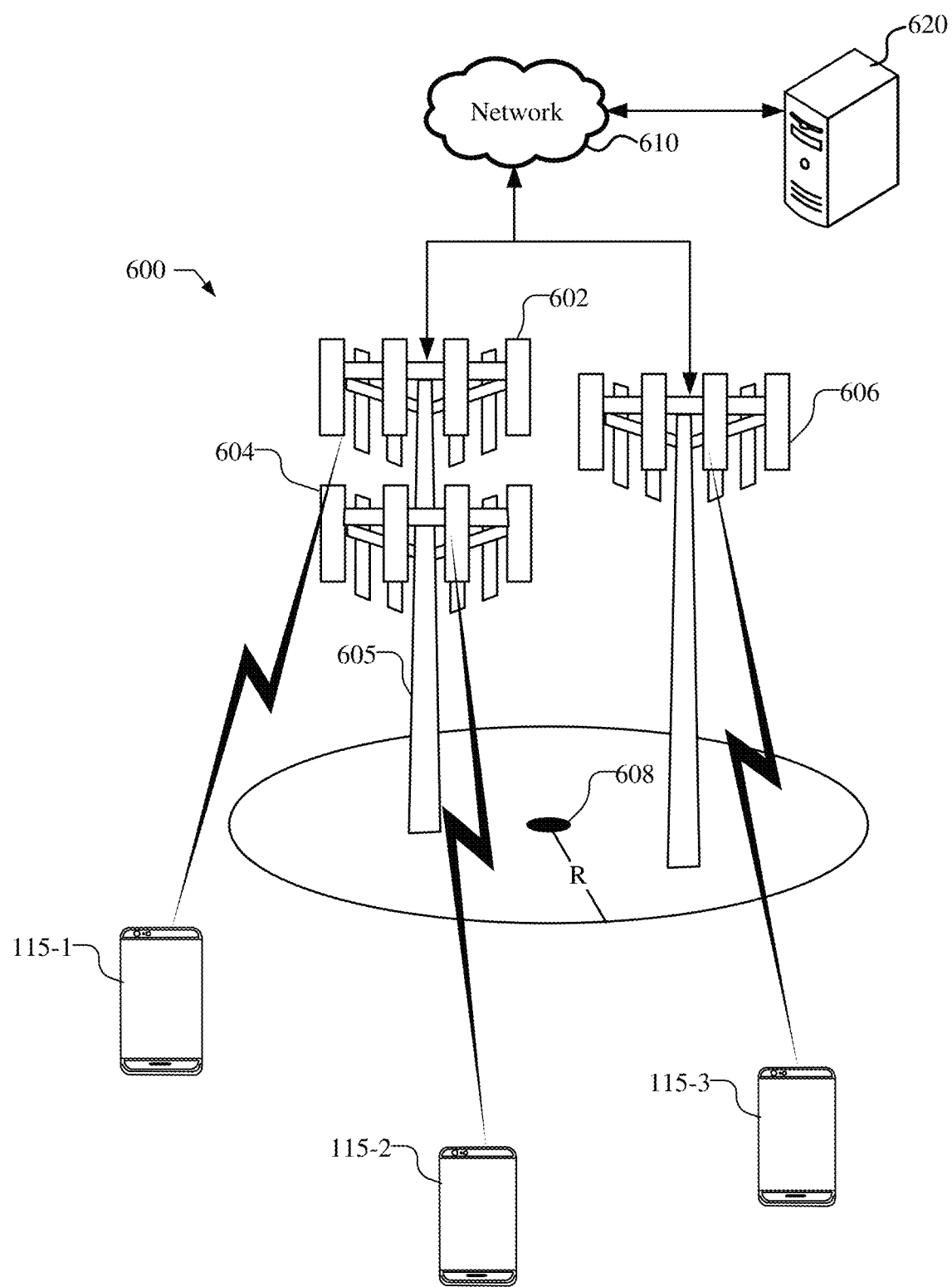
FIG. 6 illustrates a number of co-located TRPs sending PRS for positioning to UEs.

FIG. 6 illustrates an environment 600 with a number of co-located TRPs 602, 604, and 606 in communication with UEs 115-1, 115-2, and 115-3, e.g., sending PRS for positioning. The TRPs 602 and 604, for example, may be considered co-located as they are same tower 605, while TRP 606 is considered co-located with TRPs 602 and 604 as it may be located on the same building or are located within a predetermined radius R from a central point 608.

The restriction(s) on the configuration of PRS parameters, e.g., the restriction on the type of orthogonality for the co-located TRPs 602, 604, and 606, may be instituted and controlled in a variety of ways. For example, in one implementation, the restriction on the type of orthogonality may be configured by the vendor or operator of each TRP at the time of installation of the TRP. For example, the slots and symbols along with frequency offset and comb size may be assigned and code sequence parameters are unassigned to PRS resources for the TRP being installed by the TRP operator. The TRP operator will determine whether the TRP being installed is co-located with other TRP based on known locations of nearby TRPs and may assign the orthogonality parameters accordingly, i.e., so that co-located TRPs are restricted to using only CDM, i.e., using different scrambling code IDs, and not using FDM or TDM, i.e., using the same comb size, frequency offset, slot offset, and symbol offset.

Operator control of restrictions on the type of orthogonality for co-located TRPs, however, will not be optimal due to the heterogenous nature of 5G NR. For example, there may be many nearby TRPs, e.g., in small cells, macro cells, private networks, etc., all operating in 5G NR. Accordingly, the use of central entity to assign PRS configuration parameters to newly installed TRPs may be advantageous.

Accordingly, in one implementation, a central authority such as server 620, may configure the restriction on the type of orthogonality for each TRP at the time of installation of the TRP. The server 620, for example, may be a location server such as LMF 196 shown in FIG. 1, which may connect to the TRPs through one or more entities in network 610, such as an AMF 192. The server 620 is aware of the TRP location, e.g., for the purpose of computing positioning fixes for UEs, and thus, can determine if a newly installed TRP is co-located with other TRPs, e.g., on the same tower, building, or within a predetermined distance from other TRPs or within a predetermined radius from a central point. For example, the location of the newly installed TRP may be provided to the server 620, with which the server 620 may identify any co-located TRPs.

Additionally, PRS configurations that are supported by the newly installed TRP may be provided to the server 620. For example, all possible PRS configurations supported by the TRP may be provided to the server 620. The supported PRS configurations may be provided to the server 620 along with the location of the TRP. The supported PRS configurations for the TRP, for example, may include how many slots and symbols that the TRP can support of PRS, comb-symbol options, repetition factor, etc. Based on the supported PRS configurations and the PRS parameter configurations of co-located TRPs, e.g., which are stored in a database by the server 620, the server 620 may determine configuration of PRS parameters for the new TRP, such as the orthogonality parameters, e.g., so that co-located TRPs are restricted to using only CDM, i.e., using different scrambling code IDs, and not using FDM or TDM, i.e., using the same comb size, frequency offset, slot offset, and symbol offset. The server 620 may assign the PRS parameter configurations to the new TRP or may recommend the PRS parameter configuration to the operator of the TRP. The recommended PRS parameter configurations may be accepted by the operator of the TRP or revised by the operator (e.g., applying appropriate restrictions to the type of orthogonality, as discussed herein) and the server 620 informed of the revision to the PRS parameter configurations. The server 620 may maintain a database of the PRS parameter configurations for each TRP, which may be used when determining PRS parameter configurations for a new TRP that is co-located with other TRPs.

Figure 7:
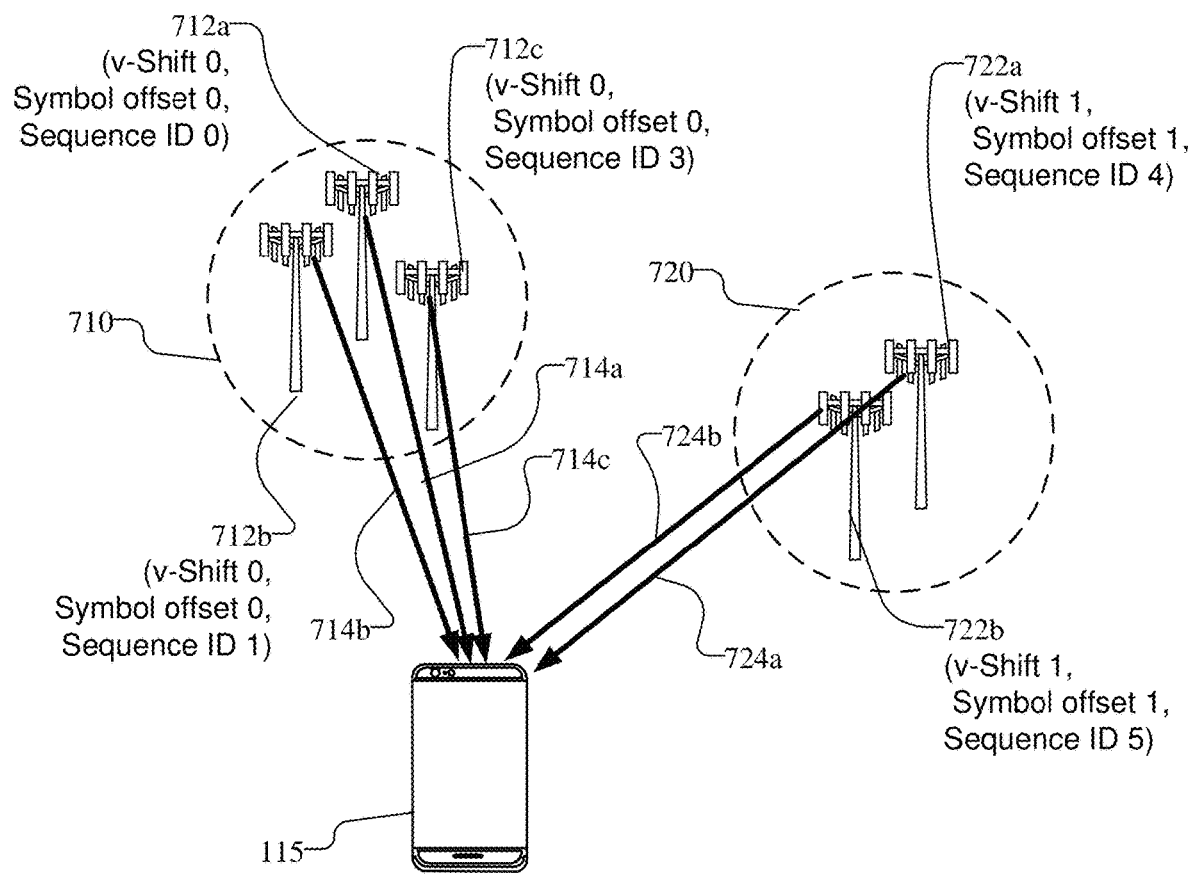
FIG. 7 illustrates multiple sets of co-located TRPs with restrictions on the orthogonality of PRS resources.

FIG. 7 illustrates multiple co-located TRP sets 710 and 720, each including TRPs transmitting PRS signals to a UE 115 via downlink channels. As illustrated, co-located TRP set 710 is illustrated as including three TRPs 712a, 712b, and 712c (collectively sometimes referred to as TRPs 712) and co-located TRP set 720 is illustrated as including two TRPs 722a and 722b (collectively sometimes referred to as TRPs 722). As illustrated, TRPs 712a, 712b and 712c transmit respective PRS signals 714a, 714b, and 714c to UE 115 and TRPs 722a and 722b transmit respective PRS signals 724a and 724b to UE 115.

As illustrated in FIG. 7, the TRPs 712 in co-located TRP set 710 are assigned the same frequency offset and symbol offset, but may be assigned different code sequence IDs. Also illustrated in FIG. 7, the TRPs 722 in co-located TRP set 720 are assigned the same frequency offset and symbol offset, but may be assigned different code sequence IDs. The TRPs 722 in co-located TRP set 720, however, may be assigned different frequency offsets and symbol offsets than the TRPs 712 in co-located TRP set 710.

Thus, the TRPs 712a, 712b, and 712c and the TRPs 722a and 722b are restricted to using only CDM with respect to their co-located TRPs, i.e., using different scrambling code IDs, and not using FDM or TDM, i.e., using the same comb size, frequency offset, slot offset, and symbol offset, but are not restricted to the type of orthogonality used with respect to non-co-located TRPs. Accordingly, the PRS signals 714a, 714b, 714c, 724a, and 724b transmitted by the TRPs 712a, 712b, 722a and 722b, respectively, are transmitted with the PRS resources restricted to only code division multiplexing orthogonality with respect to PRS transmitted from the co-located TRPs.

In addition to the use of orthogonality, another PRS configuration parameter that may be used to prevent or reduce interference is muting. Similar to LTE, muting of DL PRS resources is also supported in NR positioning. Muting is used to turn-off (e.g., transmit with zero-power) DL PRS resources to reduce the interference in case of colliding DL PRS resources across TRPs. Muting is signaled using a bit-map to indicate which configured DL PRS resources are transmitted with zero-power. Two muting options are supported for NR, Option 1 is inter-instance muting and Option 2 is intra instance muting.

Figure 8A:
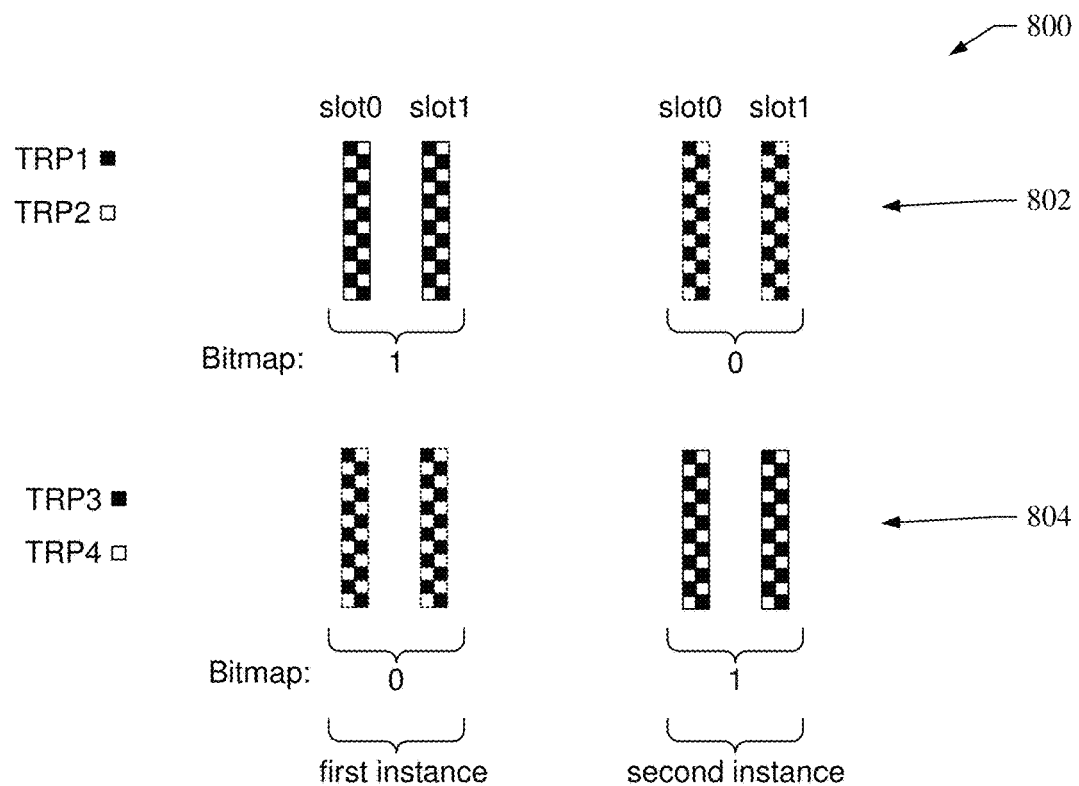
FIG. 8A illustrates an example of inter-instance PRS muting.

FIG. 8A, for example, illustrates an example configuration 800 for Option 1 inter-instance PRS muting for a scenario of four TRPs transmitting PRS having comb-2, 2 symbols per PRS resource repetition, and two repetitions per instance. As illustrated, there are four TRPs (TRP1, TRP2, TRP3, TRP4). Each TRP transmits a PRS of comb-2/2-symbol with repetition of 2 in consecutive slots. Comb-K indicates that in each symbol, the transmission scheduled is for each TRP to transmit in every Kth subcarrier, with each TRP transmitting using different subcarriers in each symbol. Consequently, the different TRPs are frequency-division multiplexed to use different subcarriers to transmit PRS signals such that the PRS signals from different TRPs transmitted concurrently are frequency orthogonal to help prevent collisions between the PRS signals. Further, the TRPs may switch subcarriers, called staggering, for different symbols within a repetition to help fill holes in the frequency domain to help eliminate aliases in the time domain. As illustrated, TRP1 and TRP2 are illustrated in a first row 802, with darkened and undarkened squares, respectively, and TRP3 and TRP4 are illustrated in a second row 804, with darkened and undarkened squares, respectively. The two repetitions per instance in this example are transmitted in consecutive slots (slot0 and slot1).

In the inter-instance PRS muting configuration shown in FIG. 8A, each TRP is configured with a 2-bit bitmap with each bit corresponding to each of the two instances e.g., the first instance and second instance. If the value of the bit is "1" the TRP transmits in that instance, and if the bit value is "0" the TRP mutes all repetition of the PRS resource in that specific instance (illustrated with dotted lines). The TRP1 and TRP2 pair, shown in row 802, has a bitmap muting configuration of "10" and the TRP3 and TRP4 pair, shown in row 804, has a bitmap muting configuration of "01" in this example. In the inter-instance muting shown, all DL-PRS resource repetitions within a DL-PRS resource set instance are muted for a DL-PRS resource set instance that is indicated to be muted by the bitmap. Each bit in the bit map corresponds to a configurable number of consecutive instances of a PRS Resource Set controlled by PRS Muting-Bit Repetition Factor, with values {1, 2, 4, 8}.

As can be seen, in the inter-instance PRS muting configuration 800, the UE 115 will need to receive both instances (the first instance and the second instance) in order to obtain PRS from all four TRPs. This is because, in the first instance, TRP1 and TRP2 will transmit PRS in both repetitions (slot0 and slot1) while TRP3 and TRP4 are muted, and in the second instance only TRP3 and TRP4 will transmit PRS in both repetitions (slot0 and slot1) while TPR1 and TRP2 are muted.

Figure 8B:
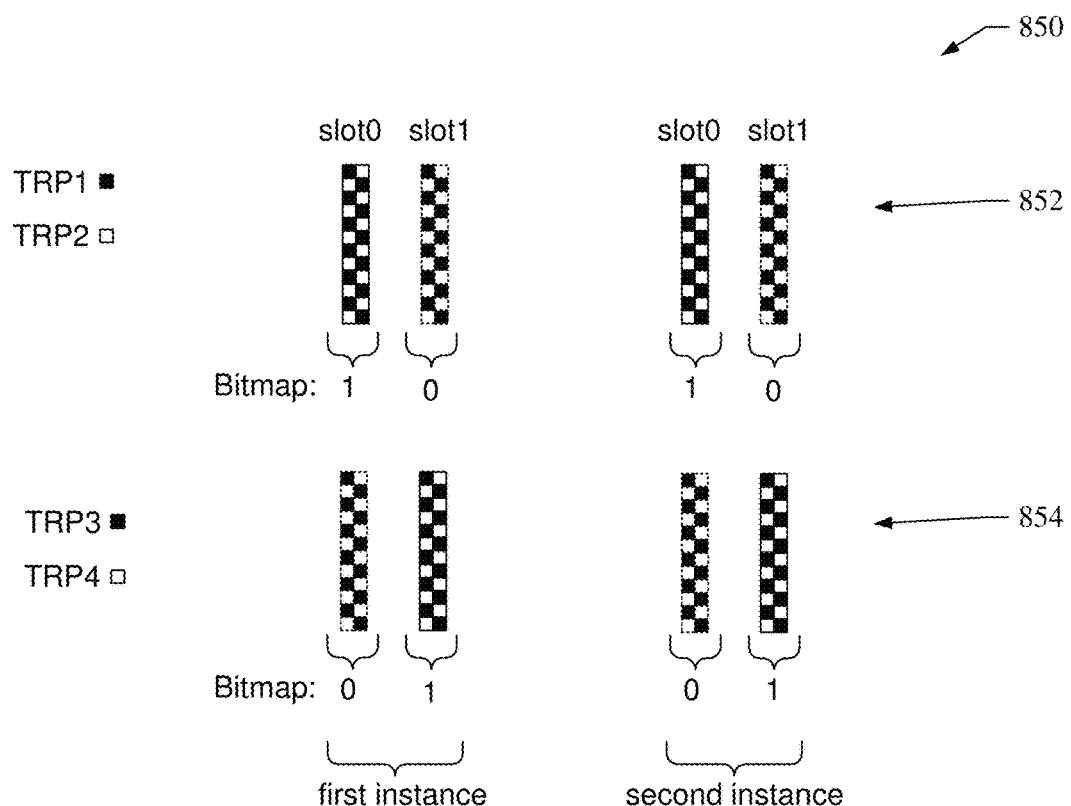
FIG. 8B illustrates an example of intra-instance PRS muting.

FIG. 8B is similar to FIG. 8A but illustrates an example configuration 850 for Option 2 intra-instance PRS muting. Thus, in FIG. 8B illustrates four TRPs transmitting PRS having comb-2, 2 symbols per PRS resource repetition, and two repetitions per instance. In the intra-instance PRS muting configuration illustrated in FIG. 8B, each TRP is configured with a 4-bit bitmap, with each bit corresponding to each of the two repetitions in a single instance. If the value of the bit is "1" the TRP transmits in that repetition index, and if the bit value is "0" the TRP mutes the PRS in that repetition index (illustrated with dotted lines). The TRP1 and TRP2 pair, shown in row 852, has a bitmap muting configuration of "1010" and the TRP3 and TRP4 pair, shown in row 854, has a bitmap muting configuration of "0101" in this example.

In the intra-instance muting configuration shown, each repetition of the PRS, e.g., in slot0 and slot1, are separately indicated to be muted by the bitmap. Thus, as illustrated, the PRS signals from TRP1 and TRP2 are not muted during a first repetition (slot0) during the first instance, and are muted during a second repetition (slot1) during the first instance. Conversely, the PRS signals from TRP3 and TRP4 are muted during the first repetition (slot0) during the first instance, and are not muted during the second repetition (slot1) during the first instance. A similar schedule is followed for the second instance as for the first instance. Accordingly, the UE 115 may measure PRS signals from all four of the TRPs in a single time instance.

Thus, as can be seen in FIGS. 8A and 8B, with intra-instance muting (shown in FIG. 8B), within a single instance, each TRP is configured with PRS with repetitions, some of which are muted according to the muting bitmap, up to 32 bits, since there is up to 32 repetition length of one instance. In contrast, with inter-instance muting (shown in FIG. 8A), within one instance, all PRS repetitions from a TRP are either muted or not, and the bitmap (up to 32 bits) is used to control the muting across instances. Accordingly, the UE 115 may not receive PRS from one or more TRPs in a single instance, but will receive PRS from the TRPs in a subsequent instance.

In some implementations, inter-instance muting and intra-instance muting may be used together. For example, if a DL-PRS muting pattern is provided for both, the inter-instance muting and intra-instance muting may be combined using a logical operations, such as a logical AND operation, and thus, a DL-PRS resource is transmitted when both bits in the inter-instance muting and the intra-instance muting have the bit value "1," and are otherwise muted.

The muting options, i.e., Option 1 (inter-instance muting) and Option 2 (intra-instance muting) are conventionally defined per PRS resource set. For example, as per 3GPP TS 37.355, the muting option is defined per PRS resource set and is specified by the dl-PRS-MutingOption1 or dl-PRS-MutingOption2.

In one implementation, TRPs that are co-located are restricted to using the same muting option, e.g., muting Option 1, muting Option 2, or a combination of muting Option 1 and muting Option 2. Thus, co-located TRPs are restricted to using the same muting sequence type, intra-instance muting, inter-instance muting, or a combination thereof. Non-co-located TRPs will not have such as restriction and may use different muting sequence types. In some implementations, the restrictions on muting may be used in conjunction with the restrictions on orthogonality for co-located TRPs, discussed above.

Use of the same muting sequence type for co-located TRPs is advantageous as it will reduce network deployment complexity and will assist UE positioning. For example, all the PRS resources from co-located TRPs will be measured at the same time by the UE 115. The PRS resources transmitted from co-located TRPs will be restricted to the same muting sequence type, and accordingly, will be muted and unmuted in a similar manner (e.g., intra-instance, inter-instance, or a combination thereof) in each positioning occasion. This will simplify UE implementation, as the UE will obtain consistent and correlated measurements in the co-located TRPs.

Implementation of the restriction on muting sequence type for co-located TRPs may be performed in a manner similar to the restriction on type of orthogonality for the co-located TRPs discussed in reference to FIG. 6. For example, the restriction on the configuration of PRS parameters, e.g., muting sequence type, may be implemented by a central authority such as a location server 620, e.g., during a positioning session for a UE.

For example, during a positioning session for a UE, the TRP may send the location server 620 the supported PRS configurations, such as how many slots and symbols are supported, comb-symbol options, repetition factor, etc. Based on the PRS configurations supported by the TRP and the PRS configurations of co-located TRPs, the location server 620 may determine which muting sequence type is to be used with which sequence for the TRP and may send the TRP the PRS configuration parameter to the TRP. The location server 620 may maintain a database of the PRS parameter configurations for each TRP, which may be used when determining PRS parameter configurations for a TRP that is co-located with other TRPs during each positioning session.

Figure 9:
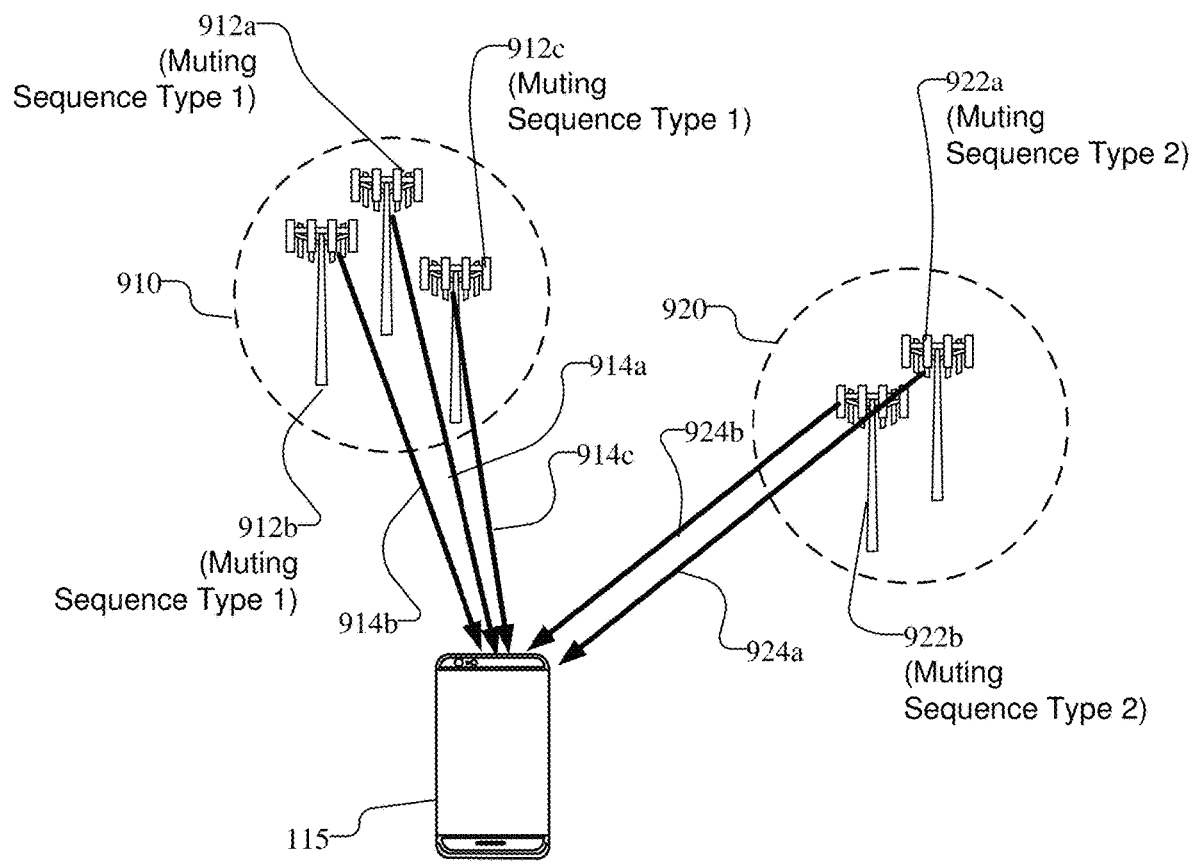
FIG. 9 illustrates multiple sets of co-located TRPs with restrictions on the muting sequence types for the PRS resources.

FIG. 9 illustrates multiple co-located TRP sets 910 and 920, each including TRPs transmitting PRS signals to a UE 115 via downlink channels. As illustrated, co-located TRP set 910 is illustrated as including three TRPs 912a, 912b, and 912c (collectively sometimes referred to as TRPs 912) and co-located TRP set 920 is illustrated as including two TRPs 922a and 922b (collectively sometimes referred to as TRPs 922). As illustrated, TRPs 912a, 912b and 912c transmit respective PRS signals 914a, 914b, and 914c to UE 115 and TRPs 922a and 922b transmit respective PRS signals 924a and 924b to UE 115.

As illustrated in FIG. 9, the TRPs 912 in co-located TRP set 910 are assigned the same muting sequence type. Also illustrated in FIG. 9, the TRPs 922 in co-located TRP set 920 are assigned the same muting sequence type. The TRPs 922 in co-located TRP set 920, however, may be assigned different muting sequence types than the TRPs 912 in co-located TRP set 910. Thus, the TRPs 912a, 912b, and 912c and the TRPs 922a and 922b are restricted to using only the same muting sequence types with respect to their co-located TRPs, but are not restricted to the muting sequence type used with respect to non-co-located TRPs. Accordingly, the PRS signals 914a, 914b, 914c, 924a, and 924b transmitted by the TRPs 912a, 912b, 922a and 922b, respectively, are transmitted with the PRS resources restricted to use the same muting sequence types as PRS transmitted from the co-located TRPs.

Figure 10:
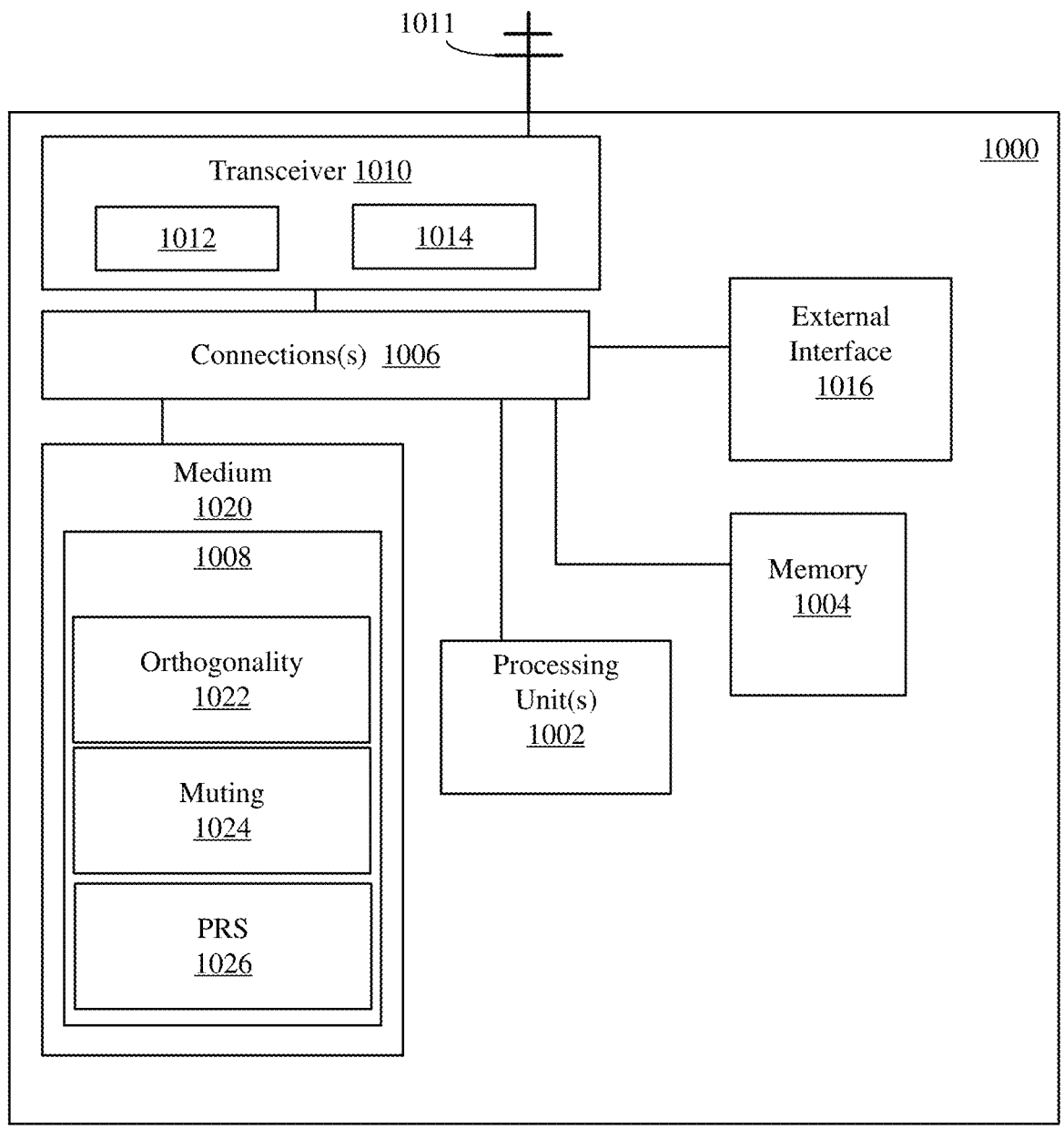
FIG. 10 shows a schematic block diagram illustrating certain exemplary features of a TRP that is configured to support positioning of the UE using restriction(s) on the configuration of PRS parameters, such as orthogonality and/or muting, for co-located TRPs.

FIG. 10 shows a schematic block diagram illustrating certain exemplary features of a TRP 1000, e.g., TRP 105 in FIG. 1, TRP 602, 604, or 606 of FIG. 6, TRP 712 or 722 of FIG. 7, TRP 912 or 922 of FIG. 9, enabled to support positioning of the UE with restriction(s) on the configuration of PRS parameters, such as orthogonality and/or muting, for co-located TRPs, as described herein. The TRP 1000 may be an eNB or gNB. The TRP 1000 may perform the process flows shown in FIGS. 13 and 14. TRP 1000 may, for example, include one or more processors 1002, memory 1004, a transceiver 1010 (e.g., wireless network interface) and an external interface 1016 (e.g., wireline or wireless network interface to other TRPs and/or entities in the core network such as a location server), which may be operatively coupled with one or more connections 1006 (e.g., buses, lines, fibers, links, etc.) to non-transitory computer readable medium 1020 and memory 1004. The TRP 1000 may further include additional items. For example, the external interface may further include an interface with an operator, which may include e.g., a display, a keypad or other input device, such as virtual keypad on the display, through which an operator may interface with the TRP. In certain example implementations, all or part of TRP 1000 may take the form of a chipset, and/or the like. Transceiver 1010 may, for example, include a transmitter 1012 enabled to transmit one or more signals over one or more types of wireless communication networks and a receiver 1014 to receive one or more signals transmitted over the one or more types of wireless communication networks. The external interface 1016 may be a wired or wireless interface capable of connecting to other TRPs in the RAN or network entities, such as a LMF 196 in FIG. 1 or location server 620 shown in FIG. 6.

In some embodiments, TRP 1000 may include antenna 1011, which may be used to transmit and/or receive signals processed by transceiver 1010. In some embodiments, antenna 1011 may be coupled to transceiver 1010. In some embodiments, measurements of signals received (transmitted) by TRP 1000 may be performed at the point of connection of the antenna 1011 and transceiver 1010. For example, the measurement point of reference for received (transmitted) RF signal measurements may be an input (output) terminal of the receiver 1014 (transmitter 1012) and an output (input) terminal of the antenna 1011. In a TRP 1000 with multiple antennas 1011 or antenna arrays, the antenna connector may be viewed as a virtual point representing the aggregate output (input) of multiple antennas. In some embodiments, TRP 1000 may measure received signals including signal strength and TOA measurements and the raw measurements may be processed by the one or more processors 1002.

The one or more processors 1002 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of TRP 1000.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in TRP 1000, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors. A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in TRP 1000 is merely exemplary, and as such the functionality of the modules and/or data structures may be combined, separated, and/or be structured in different ways depending upon the implementation of the TRP 1000.

The medium 1020 and/or memory 1004 may include an orthogonality module 1022 that when implemented by the one or more processors 1002 configures the one or more processors 1002 to control the orthogonality of PRS transmitted by transceiver 1010 with respect to PRS transmitted by other TRPs. The one or more processors 1002 may be configured to restrict orthogonality of transmitted PRS resources with respect to PRS resources from co-located TRPs to only code division multiplexing, e.g., with the PRS resources prohibited from being orthogonal to PRS resources from the co-located TRPs using time division multiplexing or frequency divisional multiplexing. For example, the PRS resources may be assigned a same slot offset, symbol offset, comb size, and resource element (RE) offset as PRS resources from the co-located TRPs, and the PRS resources are assigned different code sequence identifiers than PRS resources from the co-located TRPs. The one or more processors 1002 may be configured, for example, to send to a server, via external interface 1016, all possible PRS configurations supported by the TRP and to receive from the server PRS configuration parameters that restrict the TRP to only code division multiplexing. The one or more processors 1002 may be configured, for example, to receive instructions, e.g., from an operator via the external interface 1016, restricting the TRP to only code division multiplexing.

The medium 1020 and/or memory 1004 may include a muting module 1024 that when implemented by the one or more processors 1002 configures the one or more processors 1002 to control the muting of PRS transmitted by transceiver 1010 with respect to PRS transmitted by other TRPs. The one or more processors 1002 may be configured to restrict muting of PRS resources to the same sequence type PRS as PRS resources from co-located TRPs, e.g., inter-instance muting or intra-instance muting, or a combination thereof. The one or more processors 1002 may be configured, for example, to send to a server, via external interface 1016, all possible PRS configurations supported by the TRP and to receive from the server PRS configuration parameters that restrict the muting sequence type. The possible PRS configurations supported by the TRP may be sent and the server PRS configuration parameters may be received, for example, during a positioning session for a UE.

The medium 1020 and/or memory 1004 may include a PRS module 1026 that when implemented by the one or more processors 1002 configures the one or more processors 1002 to transmit, via the wireless transceiver 1010, PRS to the one or more UEs with the PRS resources, which are restricted with respect to PRS transmitted from the co-located TRPs. For example, the PRS transmitted by transceiver 1010 may be restricted to use only code division multiplexing orthogonality with respect to PRS transmitted from the co-located TRPs. The PRS transmitted by transceiver 1010 may alternatively or additionally be restricted to use the same muting sequency type as PRS transmitted from the co-located TRPs.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program 1008. For example, the non-transitory computer readable medium including program code 1008 stored thereon may include program code 1008 to support positioning of the UE with restriction(s) on the configuration of PRS parameters, such as orthogonality and/or muting, for co-located TRPs in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include a transceiver 1010 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable code 1008 stored thereon, which if executed by one or more processors 1002 may be operatively enabled to perform all or portions of the example operations as described herein. Computer readable medium 1020 may be a part of memory 1004.

Figure 11:
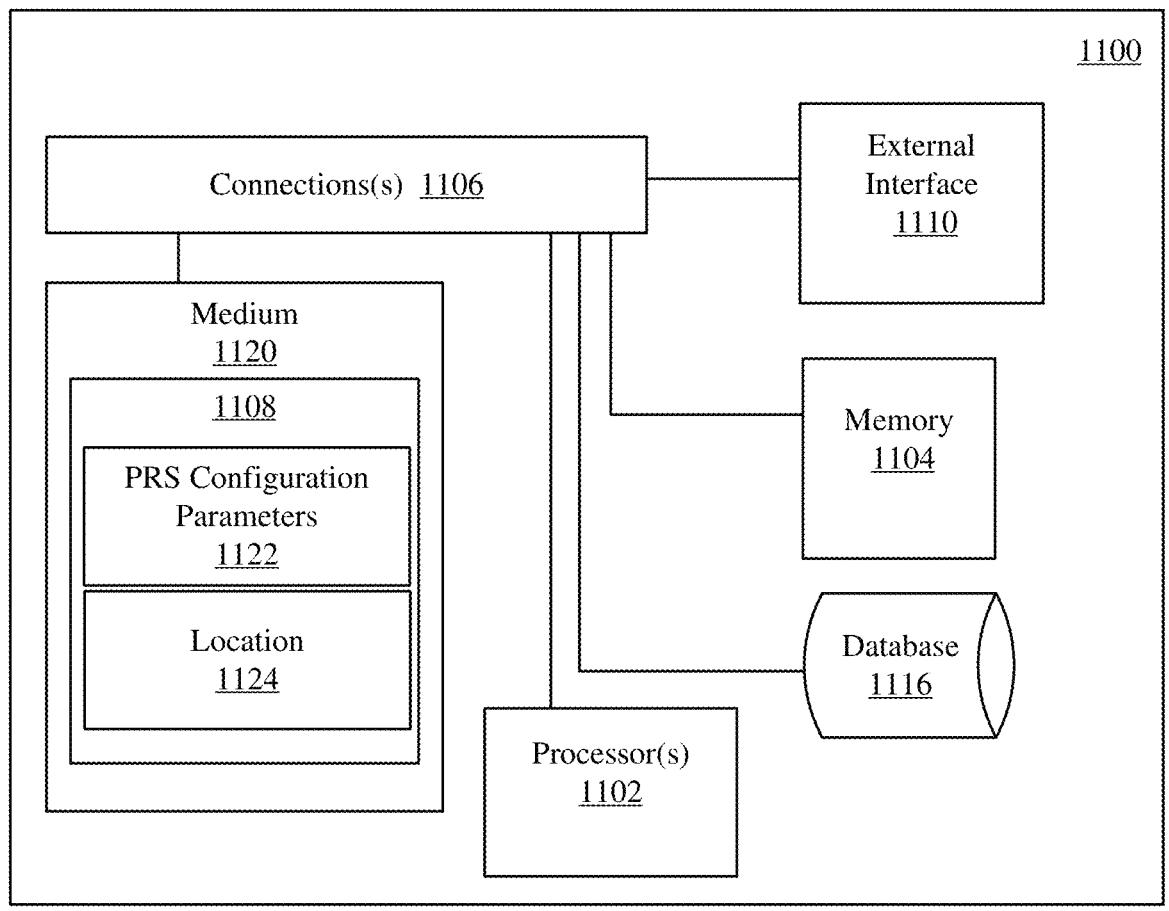
FIG. 11 shows a schematic block diagram illustrating certain exemplary features of a server that is configured to support positioning of the UE using restriction(s) on the configuration of PRS parameters, such as orthogonality and/or muting, for co-located TRPs.

FIG. 11 shows a schematic block diagram illustrating certain exemplary features of a server 1100, e.g., LMF 196 shown in FIG. 1 or server 620 shown in FIG. 6, enabled to support positioning of the UE using restriction(s) on the configuration of PRS parameters, such as orthogonality and/or muting, for co-located TRPs, as described herein. The server 1100 may be location server such as an E-SMLC or LMF. The server 1100 may perform the process flow shown in FIG. 14. Server 1100 may, for example, include one or more processors 1102, memory 1104, and an external interface 1110 (e.g., wireline or wireless network interface to other network entities, such as core network entities and TRPs), and a database 1116 for storing data with respect to TRPs, which may be operatively coupled with one or more connections 1106 (e.g., buses, lines, fibers, links, etc.) to non-transitory computer readable medium 1120 and memory 1104. The server 1100 may further include additional items, which are not shown, such as a user interface that may include e.g., a display, a keypad or other input device, such as virtual keypad on the display, through which a user may interface with the server. In certain example implementations, all or part of server 1100 may take the form of a chipset, and/or the like. The external interface 1110 may be a wired or wireless interface capable of connecting to base stations in the RAN or network entities, such as an AMF or MME.

The one or more processors 1102 may be implemented using a combination of hardware, firmware, and software. For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of server 1100.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in server 1100, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors. A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in server 1100 is merely exemplary, and as such the functionality of the modules and/or data structures may be combined, separated, and/or be structured in different ways depending upon the implementation of the server 1100.

The medium 1120 and/or memory 1104 may include PRS configurations parameters module 1122 that when implemented by the one or more processors 1102 configures the one or more processors 1102 to determine PRS configuration parameters for TRPs, e.g., to restrict one or more PRS parameters of a TRP based on co-located TRPs. The one or more processors 1102 may be configured, for example, to receive from a TRP, via the external interface 1110, all possible PRS configurations supported by the TRP. The one or more processors 1102 may be configured to determine, based on supported PRS configurations and the PRS resource configurations for co-located TRPs, e.g., stored in database 1116, to determine PRS configuration parameters for the TRP. For example, the PRS configuration parameters may restrict orthogonality of PRS resources transmitted by the TRP with respect to PRS resources from the co-located TRPs to only code division multiplexing, e.g., where the PRS resources transmitted by the TRP are prohibited from being orthogonal to PRS resources from the co-located TRPs using time division multiplexing or frequency divisional multiplexing. The PRS configuration parameters may not restrict orthogonality of the PRS resources transmitted by the TRP with respect to PRS resources from non-co-located TRPs. The PRS configuration parameters may restrict orthogonality e.g., by assigning a same slot offset, symbol offset, comb size, and resource element (RE) offset as the PRS resources from the co-located TRPs, and the PRS resources are assigned different code sequence identifiers than PRS resources from the co-located TRPs. Additionally or alternatively, the PRS configuration parameters may restrict the muting sequence type used for PRS resources transmitted by the TRP to be the same as the muting sequence type used for PRS resources from the co-located TRPs, e.g., which may be one of inter-instance muting or intra-instance muting, or a combination thereof. The one or more processors 1102 may be further configured to send to the TRP, via the external interface 1110, the PRS configuration parameters. The one or more processors 1102 may be configured to store the determined PRS configuration parameters for the TRP, e.g., either sent to the TRP or received from the TRP, in the database 1116.

The medium 1120 and/or memory 1104 may include a location module 1124 that when implemented by the one or more processors 1102 configures the one or more processors 1102 to determine co-located TRPs for a TRP. The one or more processors 1102, for example, may be configured to receive a location of the TRP, via the external interface 1110, which may be received, for example, with the PRS configuration parameters supported by the TRP. The one or more processors 1102, for example, may be configured to determine TRPs that are co-located with the TRP based on locations of TRPs stored in the database 1116. The co-located TRPs, for example, may be determined based on whether the TRPs are located on the same tower or building or located near the TRP, such as located within a predetermined radius from a central point or located within a predetermined distance from each other.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support positioning of the UE using restriction(s) on the configuration of PRS parameters, such as orthogonality and/or muting, for co-located TRPs in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include an external interface 1110 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by one or more processors 1102 may be operatively enabled to perform all or portions of the example operations as described herein. Computer readable medium 1120 may be a part of memory 1104.

Figure 12:
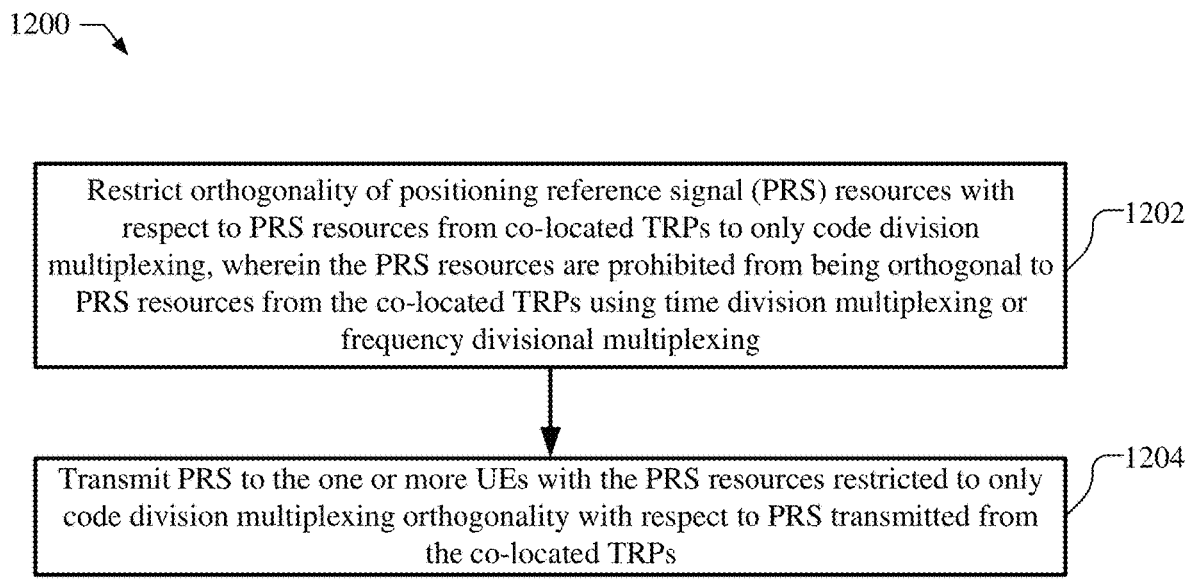
FIG. 12 shows a flow diagram for a method performed by a TRP to support positioning of one or more user equipments (UEs), as discussed herein.

FIG. 12 shows a flow diagram for an exemplary method 1200 performed by a Transmission Reception Point (TRP) in wireless network to support positioning of one or more user equipments (UEs). The TRP, for example, may be a TRP such as TRP 105, 602, 712, or 1100.

At block 1202, orthogonality of positioning reference signal (PRS) resources from the TRP are restricted with respect to PRS resources from co-located TRPs to only code division multiplexing, wherein the PRS resources are prohibited from being orthogonal to PRS resources from the co-located TRPs using time division multiplexing or frequency divisional multiplexing, e.g., as discussed in reference to FIGS. 5A, 5B, 5C, 6, and 7. The co-located TRPs, for example, may be TRPs within a predetermined distance from each other. The PRS resources, for example, may be assigned a same slot offset, symbol offset, comb size, and resource element (RE) offset as PRS resources from the co-located TRPs, and the PRS resources are assigned different code sequence identifiers than PRS resources from the co-located TRPs. A means for restricting orthogonality of positioning reference signal (PRS) resources with respect to PRS resources from co-located TRPs to only code division multiplexing, wherein the PRS resources are prohibited from being orthogonal to PRS resources from the co-located TRPs using time division multiplexing or frequency divisional multiplexing may include, e.g., the external interface 1012 and one or more processors 1002 with dedicated hardware or implementing executable code or software instructions in memory 1004 and/or medium 1020 in TRP 1000, such as the orthogonality module 1022, shown in FIG. 10.

At block 1204, the TRP transmits PRS to the one or more UEs with the PRS resources restricted to only code division multiplexing orthogonality with respect to PRS transmitted from the co-located TRPs, e.g., e.g., as discussed in reference to FIGS. 5A, 5B, 5C, 6, and 7. A means for transmitting PRS to the one or more UEs with the PRS resources restricted to only code division multiplexing orthogonality with respect to PRS transmitted from the co-located TRPs may include, e.g., the wireless transceiver 1010 and one or more processors 1002 with dedicated hardware or implementing executable code or software instructions in memory 1004 and/or medium 1020 in TRP 1000, such as the PRS module 1026, shown in FIG. 10.

In one implementation, the PRS resources transmitted by the TRP are orthogonal with respect to PRS resources from non-co-located TRPs, for example, using code division multiplexing, time division multiplexing, frequency divisional multiplexing, or a combination thereof.

In one implementation, the orthogonality of the PRS resources may be restricted with respect to PRS resources from the co-located TRPs by the TRP sending a server all possible PRS configurations supported by the TRP, e.g., as discussed in reference to FIG. 6, and the TRP receiving from the server PRS configuration parameters restricting the TRP to only code division multiplexing, e.g., as discussed in reference to FIG. 6. A means for sending a server all possible PRS configurations supported by the TRP may include, e.g., the external interface 1016 and one or more processors 1002 with dedicated hardware or implementing executable code or software instructions in memory 1004 and/or medium 1020 in TRP 1000, such as the orthogonality module 1022, shown in FIG. 10. A means for receiving from the server PRS configuration parameters restricting the TRP to only code division multiplexing may include, e.g., the external interface 1016 and one or more processors 1002 with dedicated hardware or implementing executable code or software instructions in memory 1004 and/or medium 1020 in TRP 1000, such as the orthogonality module 1022, shown in FIG. 10.

In one implementation, the orthogonality of the PRS resources may be restricted with respect to PRS resources from the co-located TRPs by receiving instructions restricting the TRP to only code division multiplexing, e.g., as discussed in reference to FIG. 6. A means for receiving instructions restricting the TRP to only code division multiplexing may include, e.g., the external interface transceiver 1012 and one or more processors 1002 with dedicated hardware or implementing executable code or software instructions in memory 1004 and/or medium 1020 in TRP 1000, such as the orthogonality module 1022, shown in FIG. 10.

Figure 13:
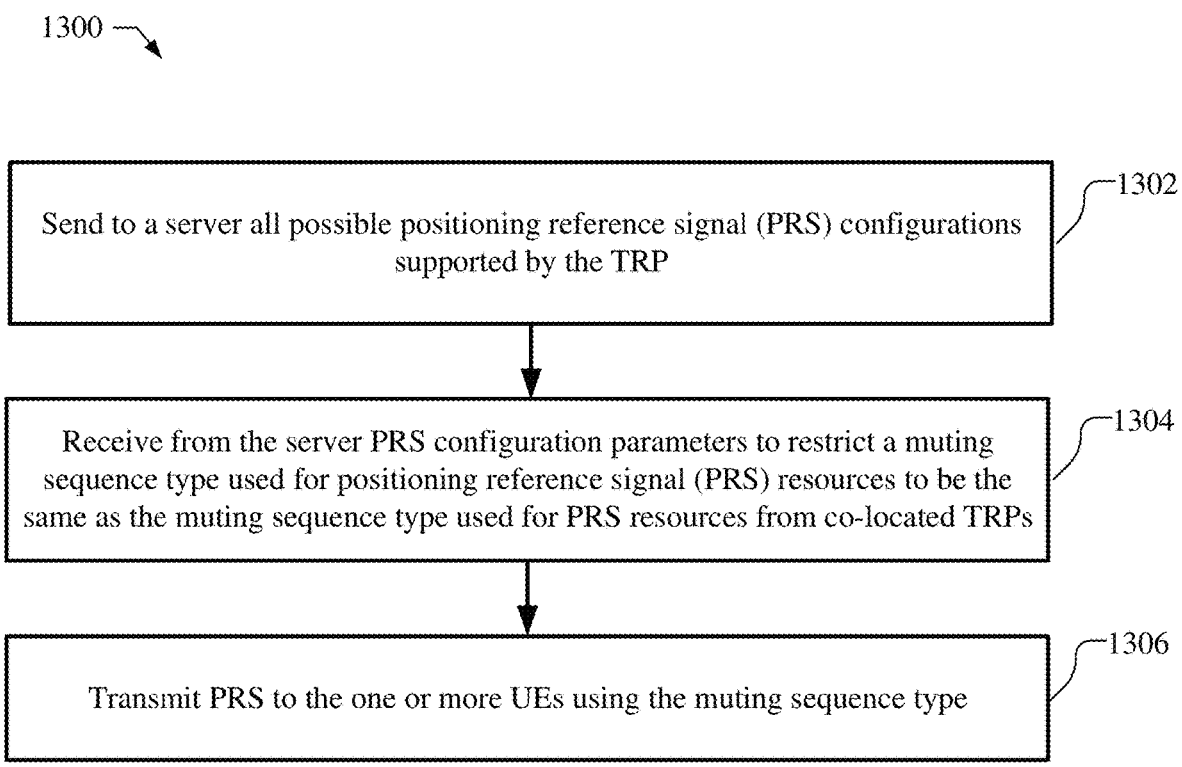
FIG. 13 shows a flow diagram for a method performed by a TRP to support positioning of one or more user equipments (UEs), as discussed herein.

FIG. 13 shows a flow diagram for an exemplary method 1300 performed by a Transmission Reception Point (TRP) in wireless network to support positioning of one or more user equipments (UEs). The TRP, for example, may be a TRP such as TRP 105, 602, 712, or 1100.

At block 1302, the TRP sends to a server (e.g., a location server and may be LMF 196, server 620, or server 1100) all possible positioning reference signal (PRS) configurations supported by the TRP, e.g., as discussed in reference to FIG. 6. A means for sending to a server all possible PRS configurations supported by the TRP may include, e.g., the external interface transceiver 1012 and one or more processors 1002 with dedicated hardware or implementing executable code or software instructions in memory 1004 and/or medium 1020 in TRP 1000, such as the muting module 1024, shown in FIG. 10.

At block 1304, the TRP receives from the server PRS configuration parameters restricting a muting sequence type used for PRS resources from the TRP are restricted to be the same as the muting sequence type used for PRS resources from co-located TRPs, e.g., as discussed in reference to FIGS. 6, 8A, 8B, and 9. The co-located TRPs, for example, may be TRPs within a predetermined distance from each other. The muting sequence type, for example, may be one of inter-instance muting or intra-instance muting, or a combination thereof. In one implementation, all possible PRS configurations are sent and the PRS configuration parameters are received during a positioning session for a UE. A means for receiving from the server PRS configuration parameters restricting a muting sequence type used for PRS resources to be the same as the muting sequence type used for PRS resources from co-located TRPs may include, e.g., the external interface 1012 and one or more processors 1002 with dedicated hardware or implementing executable code or software instructions in memory 1004 and/or medium 1020 in TRP 1000, such as the muting module 1024, shown in FIG. 10.

At block 1306, the TRP transmits transmitting PRS to the one or more UEs using the muting sequence type, e.g., as discussed in reference to FIGS. 6, 8A, 8B, and 9. A means for transmitting PRS to the one or more UEs using the muting sequence type, may include, e.g., the wireless transceiver 1010 and one or more processors 1002 with dedicated hardware or implementing executable code or software instructions in memory 1004 and/or medium 1020 in TRP 1000, such as the PRS module 1026, shown in FIG. 10.

Figure 14:
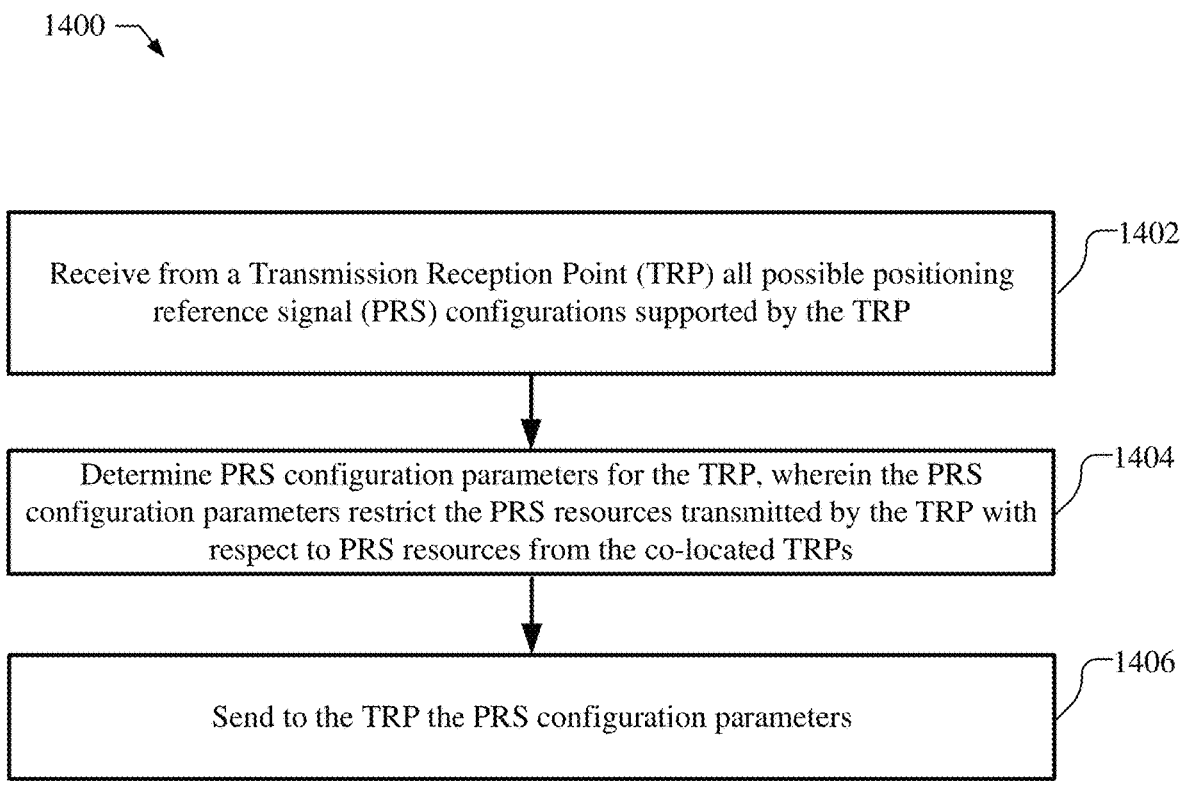
FIG. 14 shows a flow diagram for a method performed by a server to support positioning of one or more user equipments (UEs), as discussed herein.

FIG. 14 shows a flow diagram for an exemplary method 1400 performed by a server in wireless network to support positioning of one or more user equipments (UEs). The server, for example, may be a location server and may be LMF 196, server 620, or server 1100.

At block 1402, the server receives from a Transmission Reception Point (TRP) all possible positioning reference signal (PRS) configurations supported by the TRP, e.g., as discussed in reference to FIG. 6. A means for receiving from a Transmission Reception Point (TRP) all possible positioning reference signal (PRS) configurations supported by the TRP may include, e.g., the external interface 1110 and one or more processors 1102 with dedicated hardware or implementing executable code or software instructions in memory 1104 and/or medium 1120 in server 1100, such as the PRS configurations parameters module 1122, shown in FIG. 11.

At block 1404, the server determines PRS configuration parameters for the TRP, wherein the PRS configuration parameters restrict the PRS resources transmitted by the TRP with respect to PRS resources from the co-located TRPs, e.g., as discussed in reference to FIG. 6. A means for determining PRS configuration parameters for the TRP, wherein the PRS configuration parameters restrict the PRS resources transmitted by the TRP with respect to PRS resources from the co-located TRPs, may include, e.g., the external interface 1110, database 1116, and one or more processors 1102 with dedicated hardware or implementing executable code or software instructions in memory 1104 and/or medium 1120 in server 1100, such as the PRS configurations parameters module 1122, shown in FIG. 11.

At block 1406, the server sends to the TRP the PRS configuration parameters, e.g., as discussed in reference to FIG. 6. A means for sending to the TRP the PRS configuration parameters may include, e.g., the external interface 1110, database 1116, and one or more processors 1102 with dedicated hardware or implementing executable code or software instructions in memory 1104 and/or medium 1120 in server 1100, such as the PRS configurations parameters module 1122, shown in FIG. 11.

In one implementation, the server may further receive a location of the TRP, e.g., as discussed in reference to FIG. 6. The server may further determine the co-located TRPs based on the location of the TRP, e.g., as discussed in FIG. 6. A means for receiving a location of the TRP may include, e.g., the external interface 1110, and one or more processors 1102 with dedicated hardware or implementing executable code or software instructions in memory 1104 and/or medium 1120 in server 1100, such as the location module 1124, shown in FIG. 11. A means for determining the co-located TRPs based on the location of the TRP may include, e.g., the external interface 1110, the database 1116, and one or more processors 1102 with dedicated hardware or implementing executable code or software instructions in memory 1104 and/or medium 1120 in server 1100, such as the location module 1124, shown in FIG. 11.

In one implementation, the PRS configuration parameters restrict orthogonality of PRS resources transmitted by the TRP with respect to PRS resources from the co-located TRPs to only code division multiplexing, wherein the PRS resources transmitted by the TRP are prohibited from being orthogonal to PRS resources from the co-located TRPs using time division multiplexing or frequency divisional multiplexing, e.g., as discussed in reference to FIGS. 6, 8A, 8B, and 9. In some implementation, the PRS configuration parameters do not restrict orthogonality of the PRS resources transmitted by the TRP with respect to PRS resources from non-co-located TRPs, e.g., as discussed in reference to FIGS. 6, 8A, 8B, and 9. The PRS configuration parameters may restrict orthogonality of PRS resources transmitted by the TRP with respect to PRS resources from the co-located TRPs to only code division multiplexing by assigning a same slot offset, symbol offset, comb size, and resource element (RE) offset as the PRS resources from the co-located TRPs, and the PRS resources are assigned different code sequence identifiers than PRS resources from the co-located TRPs.

In one implementation, the PRS configuration parameters restrict a muting sequence type used for PRS resources transmitted by the TRP to be the same as the muting sequence type used for PRS resources from the co-located TRPs, e.g., as discussed in reference to FIGS. 6, 8A, 8B, and 9. The muting sequence type for example, may be one of inter-instance muting or intra-instance muting, or a combination thereof. The server may receive possible PRS configurations from the TRP, determine the PRS configuration parameters, and send the PRS configuration parameters restricting the muting sequence to the TRP during a positioning session for a UE.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, nonvolatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method performed by a Transmission Reception Point (TRP) for supporting positioning of one or more user equipments (UEs) in a wireless network, the method comprising: restricting orthogonality of positioning reference signal (PRS) resources with respect to PRS resources from co-located TRPs to only code division multiplexing, wherein the PRS resources are prohibited from being orthogonal to PRS resources from the co-located TRPs using time division multiplexing or frequency divisional multiplexing; and transmitting PRS to the one or more UEs with the PRS resources restricted to only code division multiplexing orthogonality with respect to PRS transmitted from the co-located TRPs.

Clause 2. The method of clause 1, wherein the co-located TRPs are TRPs within a predetermined distance from each other.

Clause 3. The method of either of clauses 1 or 2, the PRS resources are orthogonal with respect to PRS resources from non-co-located TRPs using code division multiplexing, time division multiplexing, frequency divisional multiplexing, or a combination thereof.

Clause 4. The method of any of clauses 1-3, the PRS resources are assigned a same slot offset, symbol offset, comb size, and resource element (RE) offset as PRS resources from the co-located TRPs, and the PRS resources are assigned different code sequence identifiers than PRS resources from the co-located TRPs.

Clause 5. The method of any of clauses 1-4, wherein restricting orthogonality of the PRS resources with respect to PRS resources from the co-located TRPs comprises: sending to a server all possible PRS configurations supported by the TRP; and receiving from the server PRS configuration parameters restricting the TRP to only code division multiplexing.

Clause 6. The method of any of clauses 1-5, wherein restricting orthogonality of the PRS resources with respect to PRS resources from the co-located TRPs comprises receiving instructions restricting the TRP to only code division multiplexing.

Clause 7. A Transmission Reception Point (TRP) configured for supporting positioning of one or more user equipments (UEs) in a wireless network, the TRP comprising: a wireless transceiver configured to communicate with UEs in the wireless network; at least one memory; at least one processor communicatively coupled to the wireless transceiver and the at least one memory, wherein the at least one processor is configured to: restrict orthogonality of positioning reference signal (PRS) resources with respect to PRS resources from co-located TRPs to only code division multiplexing, wherein the PRS resources are prohibited from being orthogonal to PRS resources from the co-located TRPs using time division multiplexing or frequency divisional multiplexing; and transmit, via the wireless transceiver, PRS to the one or more UEs with the PRS resources restricted to only code division multiplexing orthogonality with respect to PRS transmitted from the co-located TRPs.

Clause 8. The TRP of clause 7, wherein the co-located TRPs are TRPs within a predetermined distance from each other.

Clause 9. The TRP of either of clauses 7 or 8, the PRS resources are orthogonal with respect to PRS resources from non-co-located TRPs using code division multiplexing, time division multiplexing, frequency divisional multiplexing, or a combination thereof.

Clause 10. The TRP of any of clauses 7-9, the PRS resources are assigned a same slot offset, symbol offset, comb size, and resource element (RE) offset as PRS resources from the co-located TRPs, and the PRS resources are assigned different code sequence identifiers than PRS resources from the co-located TRPs.

Clause 11. The TRP of any of clauses 7-10, further comprising an external interface configured to communicate with entities in the wireless network, wherein the at least one processor is communicatively coupled to the external interface, and wherein the at least one processor is configured to restrict orthogonality of the PRS resources with respect to PRS resources from the co-located TRPs by being configured to: send to a server, via the external interface, all possible PRS configurations supported by the TRP; and receive from the server PRS, via the external interface, configuration parameters restricting the TRP to only code division multiplexing.

Clause 12. The TRP of any of clauses 7-11, wherein the at least one processor is configured to restrict orthogonality of the PRS resources with respect to PRS resources from the co-located TRPs by being configured to receive, via the external interface, instructions restricting the TRP to only code division multiplexing.

Clause 13. A Transmission Reception Point (TRP) configured for supporting positioning of one or more user equipments (UEs) in a wireless network, the TRP comprising: means for restricting orthogonality of positioning reference signal (PRS) resources with respect to PRS resources from co-located TRPs to only code division multiplexing, wherein the PRS resources are prohibited from being orthogonal to PRS resources from the co-located TRPs using time division multiplexing or frequency divisional multiplexing; and means for transmitting PRS to the one or more UEs with the PRS resources restricted to only code division multiplexing orthogonality with respect to PRS transmitted from the co-located TRPs.

Clause 14. The TRP of clause 13, wherein the co-located TRPs are TRPs within a predetermined distance from each other.

Clause 15. The TRP of either of clauses 13 or 14, the PRS resources are orthogonal with respect to PRS resources from non-co-located TRPs using code division multiplexing, time division multiplexing, frequency divisional multiplexing, or a combination thereof.

Clause 16. The TRP of any of clauses 13-15, the PRS resources are assigned a same slot offset, symbol offset, comb size, and resource element (RE) offset as PRS resources from the co-located TRPs, and the PRS resources are assigned different code sequence identifiers than PRS resources from the co-located TRPs.

Clause 17. The TRP of any of clauses 13-16, wherein the means for restricting orthogonality of the PRS resources with respect to PRS resources from the co-located TRPs comprises: means for sending to a server all possible PRS configurations supported by the TRP; and means for receiving from the server PRS configuration parameters restricting the TRP to only code division multiplexing.

Clause 18. The TRP of any of clauses 13-17, wherein the means for restricting orthogonality of the PRS resources with respect to PRS resources from the co-located TRPs comprises means for receiving instructions restricting the TRP to only code division multiplexing.

Clause 19. A non-transitory storage medium including program code stored thereon, the program code is operable to configure at least one processor in a Transmission Reception Point (TRP) for supporting positioning of one or more user equipments (UEs) in a wireless network, the program code comprising instructions to: restrict orthogonality of positioning reference signal (PRS) resources with respect to PRS resources from co-located TRPs to only code division multiplexing, wherein the PRS resources are prohibited from being orthogonal to PRS resources from the co-located TRPs using time division multiplexing or frequency divisional multiplexing; and transmit PRS to the one or more UEs with the PRS resources restricted to only code division multiplexing orthogonality with respect to PRS transmitted from the co-located TRPs.

Clause 20. The non-transitory storage medium of clause 19, wherein the co-located TRPs are TRPs within a predetermined distance from each other.

Clause 21. The non-transitory storage medium of either of clauses 19 or 20, the PRS resources are orthogonal with respect to PRS resources from non-co-located TRPs using code division multiplexing, time division multiplexing, frequency divisional multiplexing, or a combination thereof.

Clause 22. The non-transitory storage medium of any of clauses 19-21, the PRS resources are assigned a same slot offset, symbol offset, comb size, and resource element (RE) offset as PRS resources from the co-located TRPs, and the PRS resources are assigned different code sequence identifiers than PRS resources from the co-located TRPs.

Clause 23. The non-transitory storage medium of any of clauses 19-22, wherein the instructions to restrict orthogonality of the PRS resources with respect to PRS resources from the co-located TRPs comprise instructions to: send to a server all possible PRS configurations supported by the TRP; and receive from the server PRS configuration parameters restricting the TRP to only code division multiplexing.

Clause 24. The non-transitory storage medium of any of clauses 19-23, wherein the instructions to restrict orthogonality of the PRS resources with respect to PRS resources from the co-located TRPs comprise instructions to receive instructions restricting the TRP to only code division multiplexing.

Clause 25. A method performed by a Transmission Reception Point (TRP) for supporting positioning of one or more user equipments (UEs) in a wireless network, the method comprising: sending to a server all possible positioning reference signal (PRS) configurations supported by the TRP; receiving from the server PRS configuration parameters restricting a muting sequence type used for PRS resources to be the same as the muting sequence type used for PRS resources from co-located TRPs; and transmitting PRS to the one or more UEs using the muting sequence type.

Clause 26. The method of clause 25, wherein the co-located TRPs are TRPs within a predetermined distance from each other.

Clause 27. The method of either of clauses 25 or 26, wherein the muting sequence type is one of inter-instance muting or intra-instance muting, or a combination thereof.

Clause 28. The method of any of clauses 25-27, wherein sending all possible PRS configurations and receiving the PRS configuration parameters is performed during a positioning session for a UE.

Clause 29. A Transmission Reception Point (TRP) configured for supporting positioning of one or more user equipments (UEs) in a wireless network, the TRP comprising: a wireless transceiver configured to communicate with UEs in the wireless network; an external interface configured to communicate with entities in the wireless network; at least one memory; at least one processor communicatively coupled to the wireless transceiver, the external interface, and the at least one memory, wherein the at least one processor is configured to: send to a server, via the external interface, all possible positioning reference signal (PRS) configurations supported by the TRP; receive from the server, via the external interface, PRS configuration parameters that restrict a muting sequence type used for the PRS resources to be the same as the muting sequence type used for PRS resources from co-located TRPs; and transmit, via the wireless interface, PRS to the one or more UEs using the muting sequence type.

Clause 30. The TRP of clause 29, wherein the co-located TRPs are TRPs within a predetermined distance from each other.

Clause 31. The TRP of either of clauses 29 or 30, wherein the muting sequence type is one of inter-instance muting or intra-instance muting, or a combination thereof.

Clause 32. The TRP of any of clauses 29-31, wherein all possible PRS configurations are sent and the PRS configuration parameters are received during a positioning session for a UE.

Clause 33. A Transmission Reception Point (TRP) configured for supporting positioning of one or more user equipments (UEs) in a wireless network, the TRP comprising: means for sending to a server all possible positioning reference signal (PRS) configurations supported by the TRP; means for receiving from the server PRS configuration parameters restricting a muting sequence type used for PRS resources to be the same as the muting sequence type used for PRS resources from co-located TRPs; and means for transmitting PRS to the one or more UEs using the muting sequence type.

Clause 34. The TRP of clause 33, wherein the co-located TRPs are TRPs within a predetermined distance from each other.

Clause 35. The TRP of either of clauses 33 or 34, wherein the muting sequence type is one of inter-instance muting or intra-instance muting, or a combination thereof.

Clause 36. The TRP of any of clauses 33-35, wherein the sending all possible PRS configurations and receiving the PRS configuration parameters is performed during a positioning session for a UE.

Clause 37. A non-transitory storage medium including program code stored thereon, the program code is operable to configure at least one processor in a Transmission Reception Point (TRP) for supporting positioning of one or more user equipments (UEs) in a wireless network, the program code comprising instructions to: send to a server all possible positioning reference signal (PRS) configurations supported by the TRP; receive from the server PRS configuration parameters that restrict a muting sequence type used for the PRS resources to be the same as the muting sequence type used for PRS resources from co-located TRPs; and transmit PRS to the one or more UEs using the muting sequence type.

Clause 38. The non-transitory storage medium of clause 37, wherein the co-located TRPs are TRPs within a predetermined distance from each other.

Clause 39. The non-transitory storage medium of either of clauses 37 or 38, wherein the muting sequence type is one of inter-instance muting or intra-instance muting, or a combination thereof.

Clause 40. The non-transitory storage medium of any of clauses 37-39, wherein all possible PRS configurations are sent and the PRS configuration parameters are received during a positioning session for a UE.

Clause 41. A method performed by a server for supporting positioning of one or more user equipments (UEs) in a wireless network, the method comprising: receiving from a Transmission Reception Point (TRP) all possible positioning reference signal (PRS) configurations supported by the TRP; determining PRS configuration parameters for the TRP, wherein the PRS configuration parameters restrict the PRS resources transmitted by the TRP with respect to PRS resources from the co-located TRPs; and sending to the TRP the PRS configuration parameters.

Clause 42. The method of clause 41, further comprising: receiving a location of the TRP; and determining the co-located TRPs based on the location of the TRP.

Clause 43. The method of any of clauses 41-42, wherein the PRS configuration parameters restrict orthogonality of PRS resources transmitted by the TRP with respect to PRS resources from the co-located TRPs to only code division multiplexing, wherein the PRS resources transmitted by the TRP are prohibited from being orthogonal to PRS resources from the co-located TRPs using time division multiplexing or frequency divisional multiplexing.

Clause 44. The method of clause 43, the PRS configuration parameters do not restrict orthogonality of the PRS resources transmitted by the TRP with respect to PRS resources from non-co-located TRPs.

Clause 45. The method of any of clauses 43-44, wherein the PRS configuration parameters restrict orthogonality of PRS resources transmitted by the TRP with respect to PRS resources from the co-located TRPs to only code division multiplexing by assigned a same slot offset, symbol offset, comb size, and resource element (RE) offset as the PRS resources from the co-located TRPs, and the PRS resources are assigned different code sequence identifiers than PRS resources from the co-located TRPs.

Clause 46. The method of any of clauses 41-45, wherein the PRS configuration parameters restrict a muting sequence type used for PRS resources transmitted by the TRP to be the same as the muting sequence type used for PRS resources from the co-located TRPs.

Clause 47. The method of clause 46, wherein the muting sequence type is one of inter-instance muting or intra-instance muting, or a combination thereof.

Clause 48. The method of any of clauses 46-47, wherein receiving all possible PRS configurations, determining the PRS configuration parameters, and sending the PRS configuration parameters is performed during a positioning session for a UE.

Clause 49. A server configured for supporting positioning of one or more user equipments (UEs) in a wireless network, the server comprising: an external interface configured to communicate with entities in the wireless network; at least one memory; at least one processor communicatively coupled to the external interface, and the at least one memory, wherein the at least one processor is configured to: receive from a Transmission Reception Point (TRP), via the external interface, all possible positioning reference signal (PRS) configurations supported by the TRP; determine PRS configuration parameters for the TRP, wherein the PRS configuration parameters restrict the PRS resources transmitted by the TRP with respect to PRS resources from the co-located TRPs; and send to the TRP, via the external interface, the PRS configuration parameters.

Clause 50. The server of clause 49, wherein the at least one processor is configured to: receive, via the external interface, a location of the TRP; and determine the co-located TRPs based on the location of the TRP.

Clause 51. The server of any of clauses 49-50, wherein the PRS configuration parameters restrict orthogonality of PRS resources transmitted by the TRP with respect to PRS resources from the co-located TRPs to only code division multiplexing, wherein the PRS resources transmitted by the TRP are prohibited from being orthogonal to PRS resources from the co-located TRPs using time division multiplexing or frequency divisional multiplexing.

Clause 52. The server of clause 51, the PRS configuration parameters do not restrict orthogonality of the PRS resources transmitted by the TRP with respect to PRS resources from non-co-located TRPs.

Clause 53. The server of any of clauses 51-52, wherein the PRS configuration parameters restrict orthogonality of PRS resources transmitted by the TRP with respect to PRS resources from the co-located TRPs to only code division multiplexing by assigned a same slot offset, symbol offset, comb size, and resource element (RE) offset as the PRS resources from the co-located TRPs, and the PRS resources are assigned different code sequence identifiers than PRS resources from the co-located TRPs.

Clause 54. The server of any of clauses 49-53, wherein the PRS configuration parameters restrict a muting sequence type used for PRS resources transmitted by the TRP to be the same as the muting sequence type used for PRS resources from the co-located TRPs.

Clause 55. The server of clause 54, wherein the muting sequence type is one of inter-instance muting or intra-instance muting, or a combination thereof.

Clause 56. The server of any of clauses 54-55, wherein all possible PRS configurations are received, the PRS configuration parameters are determined and sent during a positioning session for a UE.

Clause 57. A server configured for supporting positioning of one or more user equipments (UEs) in a wireless network, the server comprising: means for receiving from a Transmission Reception Point (TRP) all possible positioning reference signal (PRS) configurations supported by the TRP; means for determining PRS configuration parameters for the TRP, wherein the PRS configuration parameters restrict the PRS resources transmitted by the TRP with respect to PRS resources from the co-located TRPs; and means for sending to the TRP the PRS configuration parameters.

Clause 58. The server of clause 57, further comprising: means for receiving a location of the TRP; and means for determining the co-located TRPs based on the location of the TRP.

Clause 59. The server of any of clauses 57-58, wherein the PRS configuration parameters restrict orthogonality of PRS resources transmitted by the TRP with respect to PRS resources from the co-located TRPs to only code division multiplexing, wherein the PRS resources transmitted by the TRP are prohibited from being orthogonal to PRS resources from the co-located TRPs using time division multiplexing or frequency divisional multiplexing.

Clause 60. The server of clause 59, the PRS configuration parameters do not restrict orthogonality of the PRS resources transmitted by the TRP with respect to PRS resources from non-co-located TRPs.

Clause 61. The server of any of clauses 59-60, wherein the PRS configuration parameters restrict orthogonality of PRS resources transmitted by the TRP with respect to PRS resources from the co-located TRPs to only code division multiplexing by assigned a same slot offset, symbol offset, comb size, and resource element (RE) offset as the PRS resources from the co-located TRPs, and the PRS resources are assigned different code sequence identifiers than PRS resources from the co-located TRPs.

Clause 62. The server of any of clauses 57-61, wherein the PRS configuration parameters restrict a muting sequence type used for PRS resources transmitted by the TRP to be the same as the muting sequence type used for PRS resources from the co-located TRPs.

Clause 63. The server of clause 62, wherein the muting sequence type is one of inter-instance muting or intra-instance muting, or a combination thereof.

Clause 64. The server of any of clauses 62-63, wherein receiving all possible PRS configurations, determining the PRS configuration parameters, and sending the PRS configuration parameters is performed during a positioning session for a UE.

Clause 65. A non-transitory storage medium including program code stored thereon, the program code is operable to configure at least one processor in a server for supporting positioning of one or more user equipments (UEs) in a wireless network, the program code comprising instructions to: receive from a Transmission Reception Point (TRP) all possible positioning reference signal (PRS) configurations supported by the TRP; determine PRS configuration parameters for the TRP, wherein the PRS configuration parameters restrict the PRS resources transmitted by the TRP with respect to PRS resources from the co-located TRPs; and send to the TRP the PRS configuration parameters.

Clause 66. The non-transitory storage medium of clause 65, further comprising instructions to: receive a location of the TRP; and determine the co-located TRPs based on the location of the TRP.

Clause 67. The non-transitory storage medium of any of clauses 65-66, wherein the PRS configuration parameters restrict orthogonality of PRS resources transmitted by the TRP with respect to PRS resources from the co-located TRPs to only code division multiplexing, wherein the PRS resources transmitted by the TRP are prohibited from being orthogonal to PRS resources from the co-located TRPs using time division multiplexing or frequency divisional multiplexing.

Clause 68. The non-transitory storage medium of clause 67, the PRS configuration parameters do not restrict orthogonality of the PRS resources transmitted by the TRP with respect to PRS resources from non-co-located TRPs.

Clause 69. The non-transitory storage medium of any of clauses 67-68, wherein the PRS configuration parameters restrict orthogonality of PRS resources transmitted by the TRP with respect to PRS resources from the co-located TRPs to only code division multiplexing by assigned a same slot offset, symbol offset, comb size, and resource element (RE) offset as the PRS resources from the co-located TRPs, and the PRS resources are assigned different code sequence identifiers than PRS resources from the co-located TRPs.

Clause 70. The non-transitory storage medium of any of clauses 65-69, wherein the PRS configuration parameters restrict a muting sequence type used for PRS resources transmitted by the TRP to be the same as the muting sequence type used for PRS resources from the co-located TRPs.

Clause 71. The non-transitory storage medium of clause 70, wherein the muting sequence type is one of inter-instance muting or intra-instance muting, or a combination thereof.

Clause 72. The non-transitory storage medium of any of clauses 70-71, wherein all possible PRS configurations are received, the PRS configuration parameters are determined and sent during a positioning session for a UE.

Therefore, it is intended that claimed subject matter not be limited to the particular examples disclosed, but that such claimed subject matter may also include all aspects falling within the scope of appended claims, and equivalents thereof.

What is claimed is:

1. A method performed by a server for supporting positioning of one or more user equipments (UEs) in a wireless network, the method comprising:
   receiving from a Transmission Reception Point (TRP) all possible positioning reference signal (PRS) configurations supported by the TRP;
   determining PRS configuration parameters for the TRP, wherein the PRS configuration parameters restrict the PRS resources transmitted by the TRP with respect to PRS resources from the co-located TRPs, wherein the PRS configuration parameters restrict orthogonality of PRS resources transmitted by the TRP with respect to PRS resources from the co-located TRPs to only code division multiplexing, wherein the PRS resources transmitted by the TRP are prohibited from being orthogonal to PRS resources from the co-located TRPs using time division multiplexing or frequency division multiplexing; and
   sending to the TRP the PRS configuration parameters.

2. The method of claim 1, wherein the PRS configuration parameters do not restrict orthogonality of the PRS resources transmitted by the TRP with respect to PRS resources from non-co-located TRPs.

3. The method of claim 1, wherein the PRS configuration parameters restrict orthogonality of PRS resources transmitted by the TRP with respect to PRS resources from the co-located TRPs to only code division multiplexing by assigned a same slot offset, symbol offset, comb size, and resource element (RE) offset as the PRS resources from the co-located TRPs, and the PRS resources are assigned different code sequence identifiers than PRS resources from the co-located TRPs.

4. A server configured for supporting positioning of one or more user equipments (UEs) in a wireless network, the server comprising:
   an external interface configured to communicate with entities in the wireless network;
   at least one memory;
   at least one processor communicatively coupled to the external interface, and the at least one memory, wherein the at least one processor is configured to:
      receive from a Transmission Reception Point (TRP), via the external interface, all possible positioning reference signal (PRS) configurations supported by the TRP;
      determine PRS configuration parameters for the TRP, wherein the PRS configuration parameters restrict the PRS resources transmitted by the TRP with respect to PRS resources from the co-located TRPs, wherein the PRS configuration parameters restrict orthogonality of PRS resources transmitted by the TRP with respect to PRS resources from the co-located TRPs to only code division multiplexing, wherein the PRS resources transmitted by the TRP are prohibited from being orthogonal to PRS resources from the co-located TRPs using time division multiplexing or frequency division multiplexing; and
      send to the TRP, via the external interface, the PRS configuration parameters.

5. The server of claim 4, wherein the PRS configuration parameters do not restrict orthogonality of the PRS resources transmitted by the TRP with respect to PRS resources from non-co-located TRPs.

6. The server of claim 4, wherein the PRS configuration parameters restrict orthogonality of PRS resources transmitted by the TRP with respect to PRS resources from the co-located TRPs to only code division multiplexing by assigned a same slot offset, symbol offset, comb size, and resource element (RE) offset as the PRS resources from the co-located TRPs, and the PRS resources are assigned different code sequence identifiers than PRS resources from the co-located TRPs.

* * * * *